United States Patent
Maeda et al.

(10) Patent No.: US 7,930,482 B2
(45) Date of Patent: Apr. 19, 2011

(54) STORAGE SYSTEM AND METHOD FOR CONTROLLING CACHE RESIDENCY SETTING IN THE STORAGE SYSTEM

(75) Inventors: Masami Maeda, Odawara (JP); Hidetoshi Sakaki, Odawara (JP)

(73) Assignee: Hitachi, Ltd., Tokyo (JP)

( * ) Notice: Subject to any disclaimer, the term of this patent is extended or adjusted under 35 U.S.C. 154(b) by 625 days.

(21) Appl. No.: 12/013,815

(22) Filed: Jan. 14, 2008

(65) Prior Publication Data
US 2008/0229010 A1  Sep. 18, 2008

(30) Foreign Application Priority Data
Mar. 16, 2007  (JP) ................... 2007-069505

(51) Int. Cl.
*G06F 13/00* (2006.01)
*G06F 13/28* (2006.01)
*G06F 3/00* (2006.01)
*G06F 5/00* (2006.01)

(52) U.S. Cl. ............... 711/118; 711/112; 711/E12.019; 710/52

(58) Field of Classification Search ............ 711/118, 711/112, E12.019; 710/56
See application file for complete search history.

(56) References Cited

U.S. PATENT DOCUMENTS

| 2002/0062429 A1* | 5/2002 | Tsuboki et al. | 711/154 |
| 2004/0257857 A1 | 12/2004 | Yamamoto et al. | |
| 2005/0240724 A1* | 10/2005 | Koizumi et al. | 711/113 |
| 2010/0199055 A1* | 8/2010 | Furuhashi et al. | 711/165 |

FOREIGN PATENT DOCUMENTS
| JP | 10063576 A | 3/1998 |
| JP | 2005011277 A | 1/2005 |

* cited by examiner

*Primary Examiner* — Hetul Patel
*Assistant Examiner* — Edward J Dudek, Jr.
(74) *Attorney, Agent, or Firm* — Sughrue Mion, PLLC

(57) ABSTRACT

In a storage system adopting an external storage connection configuration, a first storage apparatus is capable of integrally managing the cache residency settings made in second storage apparatuses, which serve as external storage apparatuses. The first storage apparatus stores the cache residency information for the second storage apparatuses, i.e., external storage apparatuses, in a shared memory thereof. When the storage system receives a cache residency setting request from a management device or the like, the first storage apparatus issues a cache residency setting instruction to a second storage apparatus with reference to the residency information. In accordance with the setting instruction, the second storage apparatus sets a cache-resident area in a cache memory thereof.

15 Claims, 37 Drawing Sheets

| INTERNAL LDEV NUMBER | VDEV NUMBER |
|---|---|
| x0000 | X0000 |
| x0001 | X0000 |
| x0002 | X0000 |
| X0003 | X0001 |
| X0004 | X0005 |
| X0005 | X0002 |
| X0006 | X0003 |
| X0007 | X0004 |
| : | : |
| xnnnn | |

FIG.5

| VDEV NUMBER | EXTERNAL STORAGE APPARATUS NUMBER | EXTERNAL STORAGE LDEV NUMBER |
|---|---|---|
| X0000 | 0 | |
| X0001 | 0 | |
| X0002 | 0 | |
| X0003 | 1 | x0100 |
| X0004 | 1 | x0101 |
| X0005 | 3 | x0301 |
| X0006 | 0 | |
| X0007 | 1 | x0102 |
| : | : | : |
| xnnnn | | |

FIG.6

| EXTERNAL STORAGE APPARATUS NUMBER | SERIAL NUMBER | NUMBER OF PATHS | PATH NUMBER 1 | PATH NUMBER 2 | PATH NUMBER 3 | PATH NUMBER 4 |
|---|---|---|---|---|---|---|
| 0 | x13065 | 3 | PORT #0 | PORT #1 | PORT #7 | |
| 0 | x0123 | 4 | PORT #5 | PORT #15 | PORT #20 | PORT #16 |
| 0 | x09900 | 2 | PORT #6 | PORT #11 | | |
| ⋮ | ⋮ | ⋮ | ⋮ | ⋮ | ⋮ | ⋮ |
| n | | | | | | |

FIG.7

| EXTERNAL STORAGE APPARATUS NUMBER | CACHE CAPACITY | RESIDENT AREA SIZE | NUMBER OF RESIDENT AREAS |
|---|---|---|---|
| 0 | 256 GB | 32 GB | 2 |
| 1 | 128 GB | 12 GB | 2 |
| 2 | 16 GB | 0 GB | 0 |
| 3 | 24 GB | 16 GB | 1 |
| : | : | : | : |
| TOTAL | 424 GB | 60 GB | 5 |

| No. | INTERNAL LDEV NUMBER | START ADDRESS | END ADDRESS | AREA SIZE | EXTERNAL STORAGE APPARATUS NUMBER |
|---|---|---|---|---|---|
| 1 | x0001 | 01000005 | 01600005 | 15 GB | 0 |
| 2 | x0001 | 00500000 | 17500000 | 17 GB | 0 |
| 3 | x0006 | 00110000 | 08110000 | 8 GB | 1 |
| 4 | x0004 | 11000000 | 27000000 | 16 GB | 3 |
| 4 | x0007 | 33000000 | 37000000 | 4 GB | 1 |
| : | : | : | : | : | |

FIG.9

| No. | INTERNAL LDEV NUMBER | START ADDRESS | END ADDRESS | AREA SIZE |
|---|---|---|---|---|
| 1 | x0001 | 00110000 | 08110000 | 8 GB |
| 2 | x0101 | 33000000 | 37000000 | 4 GB |
| : | : | : | : | : |

| STORAGE# | SERIAL NUMBER | CACHE CAPACITY (GB) | RESIDENT AREA SIZE (GB) | RESIDUAL AREA SIZE (GB | NUMBER OF RESIDENT AREAS |
|---|---|---|---|---|---|
| FIRST STORAGE APPARATUS | x55466 | 256 | 32 | 224 | 2 |
| SECOND STORAGE APPARATUS | | | | | |
| STORAGE APPARATUS_1 | x13065 | 128 | 32 | 116 | 2 |
| STORAGE APPARATUS_2 | x00123 | 16 | 0 | 16 | 0 |
| STORAGE APPARATUS_3 | x09900 | 24 | 16 | 8 | 1 |
| : | : | : | : | : | : |
| TOTAL | | 424 | 60 | 356 | 5 |

FIG.17

| CONTROL CODE | LDEV# | START ADDRESS | END ADDRESS |
|---|---|---|---|

— 80: RESIDENCY SETTING

— 40: RESIDENCY CANCELLATION

FIG.27

| No. | INTERNAL LDEV NUMBER | START ADDRESS | END ADDRESS | AREA SIZE | EXTERNAL STORAGE APPARATUS NUMBER | PROCESS SPEED |
|---|---|---|---|---|---|---|
| 1 | x0001 | 01000005 | 01600005 | 15 GB | 0 | HIGH |
| 2 | x0001 | 00500000 | 17500000 | 17 GB | 0 | HIGH |
| 3 | x0006 | 00110000 | 08110000 | 8 GB | 1 | MEDIUM |
| 4 | x0004 | 11000000 | 27000000 | 16 GB | 3 | MEDIUM |
| 4 | x0007 | 33000000 | 37000000 | 4 GB | 1 | MEDIUM |
| : | : | : | : | : | | : |

FIG.33

| FLAG | EXTERNAL STORAGE APPARATUS NUMBER | LDEV# | START ADDRESS | END ADDRESS |

— 80: RESIDENCY SETTING

— 40: RESIDENCY CANCELLATION

STORAGE SYSTEM AND METHOD FOR CONTROLLING CACHE RESIDENCY SETTING IN THE STORAGE SYSTEM

CROSS-REFERENCES TO RELATED APPLICATIONS

This application relates to and claims priority from Japanese Patent Application number 2007-69505, filed on Mar. 16, 2007, the entire disclosure of which is incorporated herein by reference.

BACKGROUND

1. Field of the Invention

The invention relates in general to a storage system for storing data for use by host computers, and in particular, to a cache residency setting technique for the storage system.

2. Description of Related Art

Storage apparatuses are connected via networks to host computers, thereby forming a computer system. One configuration for orchestrating a plurality of storage apparatuses is an external storage connection configuration where a first storage apparatus connects a plurality of second storage apparatuses while it is connected to host computers. In this configuration, the first storage apparatus logically integrates its own logical devices with the logical devices in the second storage apparatuses and thereby provides them as a whole to the host computers, allowing the host computers to I/O-access the first storage apparatus without being aware of the existence of the second storage apparatuses.

For enhanced system performance, storage apparatuses usually have mass storage cache memory devices for providing cache functions. With a typical cache function, in terms of effective use of the cache memory, the data in the cache memory is replaced in accordance with an LRU algorithm or similar. In addition, the storage apparatuses have cache residency functions for having the data reside in predetermined areas in their cache memories at all times, while taking the characteristics of the application data into consideration.

JP2005-11277 A discloses a computer system that employs an external storage connection configuration where a storage is connected to a plurality of external storages. In this computer system, when the storages have disk cache functions, such as cache residency etc., being set, they perform input/output processing via their cache memories.

JP1998-63576 A discloses a disk array controller composed of an upper layer controller and lower layer controller, each having a cache memory. This disk array controller executes control so as not to store duplicated data in such hierarchical caches.

In storage systems adopting external storage connection configurations, external storage apparatuses—second storage apparatuses—individually manage data based on logical addresses unique only in their own storage apparatuses; accordingly, it has been extremely troublesome to set cache residency for these second storage apparatuses, which can be viewed via the first storage apparatus.

Moreover, even if cache residency is set for the second storage apparatuses, the data targeting the second storage apparatuses is also cached in the cache memory in the first storage apparatus, and thus the areas in the cache memory in the first storage apparatus are consumed more than necessary. In other words, the more the access to the second storage apparatuses increases, the more the areas in the first storage apparatus's cache memory are consumed, and the first storage apparatus cannot ensure sufficient areas in its cache memory for its own use.

SUMMARY

The invention has been devised in consideration of the above problems. According to the invention, in a storage system adopting an external storage connection configuration, a first storage apparatus is capable of integrally managing the cache residency settings made in second storage apparatuses, i.e., external storage apparatuses.

The first storage apparatus stores the cache residency information for the second storage apparatuses in its shared memory. When the first storage apparatus receives a cache residency setting request from a management device or the like, it issues a cache residency setting instruction to a second storage apparatus with reference to the cache residency information. In accordance with the setting instruction, the second storage apparatus sets a cache-resident area in its cache memory.

More specifically, one aspect of the invention provides a storage system includes a first storage apparatus that is operatively connected to a host computer and that provides a first logical device I/O-accessed by the host computer, and at least one second storage apparatus that is operatively connected to the first storage apparatus and that provides a second logical device configured as at least a part of the first logical device.

The first storage apparatus includes a first disk drive and a first controller that controls the first disk drive based on a first I/O access request from the host computer. The first controller includes a first cache memory for caching the data related to the first I/O access request from the host computer to the first disk drive.

The second storage apparatus includes a second disk drive and a second controller that is connected to the first storage apparatus and controls the second disk drive based on a second I/O access request received from the host computer via the first storage apparatus. The second controller includes a second cache memory for caching the data related to the second I/O access request from the host computer to the second disk drive.

The first controller then sends, to the second storage apparatus, a residency setting instruction to set a predetermined area in the second cache memory as a resident area. The second storage apparatus sets a resident area in the second cache memory.

Another aspect of the invention provides a method of controlling a cache-resident area used for a storage system includes a first storage apparatus that is operatively connected to a host computer and that provides a first logical device I/O-accessed by the host computer, and at least one second storage apparatus that is operatively connected to the first storage apparatus and that provides a second logical device configured as at least a part of the first logical device.

The first storage apparatus performs identifying the second storage apparatus for which resident area setting is requested, based on a residency setting request received from the outside and determining whether or not a predetermined area in the cache memory provided in the designated second storage apparatus can be set as a resident area. When it is judged that the predetermined area can be set as a resident area, the first storage apparatus performs controlling the second storage apparatus so that a resident area can be set. In response to this, the second storage apparatus sets a resident area in its cache memory.

According to still another aspect of the invention, the invention provides a storage system includes a plurality of storage apparatuses operatively connected to one another via a channel for connection with a host computer.

Each of the storage apparatuses includes a disk drive and a controller that controls the disk drive based on an I/O access request from the host computer. The controller has a cache memory for caching the data related to the I/O access request from the host computer to the disk drive.

Any one of the storage apparatuses sends, to a specified storage apparatus, a residency setting instruction to set a predetermined area in the cache memory in the specified storage area as a resident area. Having received the residency setting instruction, the specified storage apparatus sets a resident area based on the residency setting instruction.

According to the invention, in a storage system adopting the external storage connection configuration, cache-resident areas can be set in the cache memories in the second storage apparatuses. Accordingly, the system administrator can easily set cache residency for the second storage apparatuses via the first storage apparatus.

Moreover, even when the first storage apparatus frequently receives I/O access requests for the second storage apparatuses, it can use the areas in its own cache memory exclusively for itself. Accordingly, the first storage apparatus can effectively use its own cache memory, and thus prevention of degradation of the system performance of the first storage apparatus becomes possible.

Consequently, the degradation of the system performance of the entire storage system can be prevented.

BRIEF DESCRIPTION OF THE DRAWINGS

FIG. 4 is a diagram showing an example of an LDEV management table in the first storage apparatus according to an embodiment of the invention.

FIG. 5 is a diagram showing an example of a VDEV management table in the first storage apparatus according to an embodiment of this invention.

FIG. 6 is a diagram showing an example of an external storage apparatus management table in the first storage apparatus according to an embodiment of this invention.

FIG. 7 is a diagram showing an example of a cache capacity management table in the first storage apparatus according to an embodiment of the invention.

FIG. 9 is a diagram showing an example of a resident area management table in the second storage apparatus according to an embodiment of the invention.

FIG. 15 is a diagram showing an example of a cache capacity and residency setting reference screen displayed on the management device according to an embodiment of the invention.

FIG. 17 is a diagram illustrating a cache residency control command in the storage system according to an embodiment of the invention.

FIG. 27 is a diagram showing an example of the resident area management table in the first storage apparatus according to an embodiment of the invention.

FIG. 33 is a diagram illustrating a cache residency control command in the storage system according to an embodiment of the invention.

DETAILED DESCRIPTION OF PREFERRED EMBODIMENTS

Embodiments of the invention are explained below with reference to the drawings.

Embodiment 1

Figure 1:
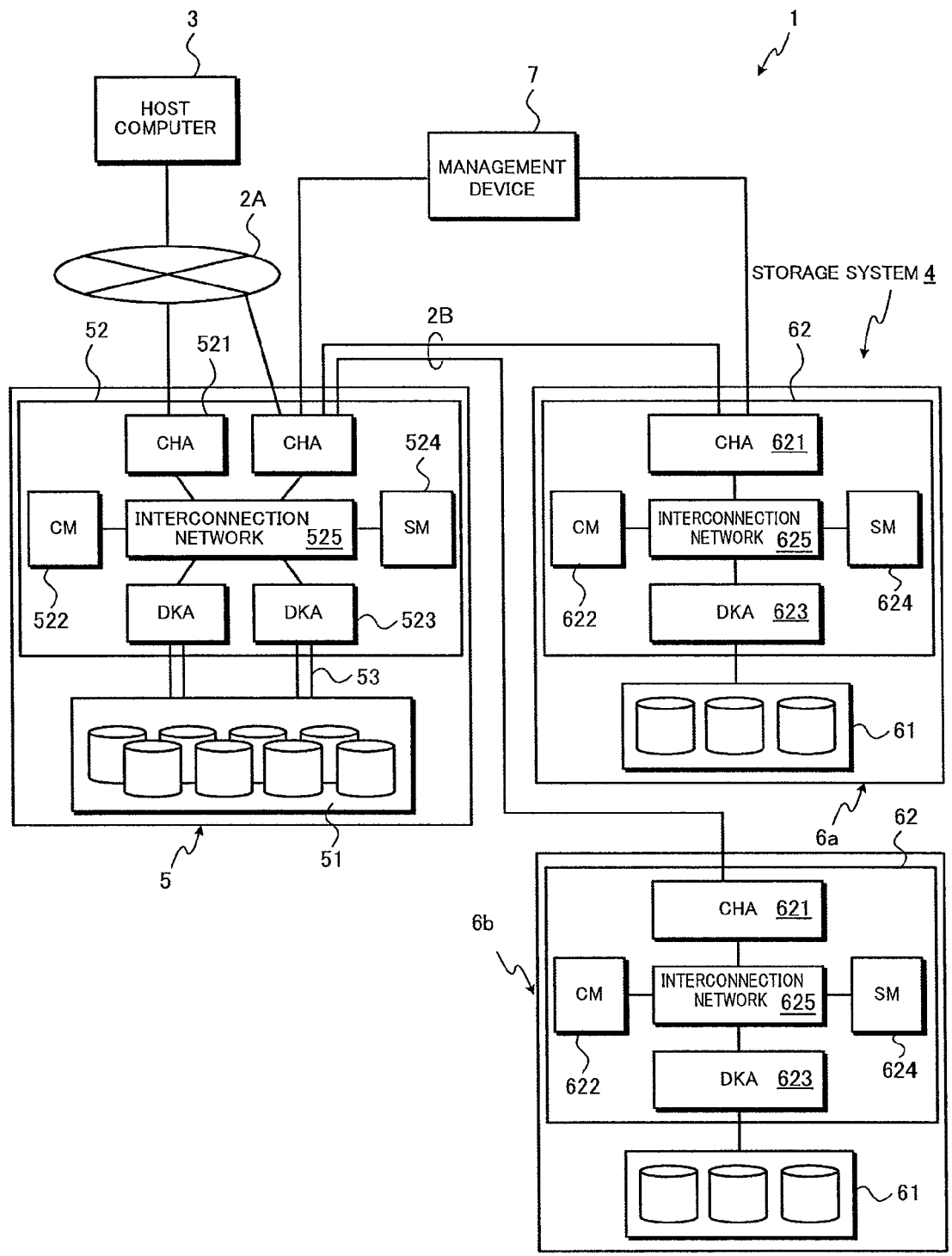
FIG. 1 is a diagram showing the structure of a computer system according to an embodiment of the invention.

FIG. 1 is a diagram showing the structure of a computer system 1 according to an embodiment of the invention. Referring to FIG. 1, the computer system 1 includes a host computer 3 and a storage system 4, which are connected to each other via a first channel 2A, and is established, for example, as a service system at a bank or an airline seat reservation service system. The computer system 1 also includes a management device 7.

The first channel 2A is, for example, a LAN, the Internet, or a SAN (Storage Area Network), and is structured to include a network switch, hub or the like. In Embodiment 1, it is assumed that the first channel 2A is a SAN (FC-SAN) using Fibre Channel Protocol.

The host computer 3 is a computer serving as the core of, for example, a service system at a bank or an airline seat reservation service system. More specifically, the host computer 3 has hardware resources including a processor, a main memory, a communication interface, and local input/output devices such as a keyboard and display; and software resources (not shown in the drawing) including a device driver, an operating system (OS), and application programs. By cooperation between these hardware resources and software resources, the host computer 3 executes various programs under the control of its processor and performs desired processing. For example, the host computer 3 executes a service application program on the OS under the control of the processor and accesses the storage system 4, which is described below in detail, to realize a desired service system.

The storage system 4 provides data-storing storage areas to the host computer 3. The storage system 4 includes a first storage apparatus 5 and a plurality of second storage apparatuses 6, each having one or more logical devices LDEV defined. These logical devices LDEV are associated with physical disk devices PDEV and recognized by the host computer 3.

The first storage apparatus 5 is connected to the host computer 3 via the first channel 2A while it connects the second storage apparatuses 6 via a second channel 2B. In other words, the second storage apparatuses 6 serve as external storage apparatuses for the first storage apparatus 5. This connection configuration is often called the external storage connection configuration. The second channel 2B may be adapted for, for example, Fibre Channel Protocol.

In the external storage connection configuration, the logical devices LDEV in the second storage apparatuses 6 ("external logical devices-E") are deemed as external devices for the first storage apparatus 5 and the host computer 3 cannot directly recognize them. The first storage apparatus 5 establishes association relationships between its own logical devices LDEV ("internal logical devices LDEV-I") and the external logical devices LDEV-E so that the host computer 3 recognizes the logical devices LDEV in the second storage apparatuses 6 (external logical devices LDEV-E).

Typically, virtual devices VDEV provided by some physical devices PDEV are also defined and the first storage apparatus 5 establishes association relationships between the internal logical devices LDEV-I and the external logical devices LDEV-E via these virtual devices VDEV. The virtual devices VDEV are provided by one or more physical devices PDEV. Accordingly, the host computer 3 recognizes only the internal logical devices LDEV-I provided in the first storage apparatus 5 but is capable of accessing the external logical devices LDEV-E without being aware of the existence of the second storage apparatuses 6. In the description below, the internal logical devices LDEV-I and external logical devices LDEV-E are sometimes simply called logical devices LDEV unless it is necessary to distinguish between them.

Each logical device LDEV has logical units LU defined. Each logical unit LU is assigned a logical unit number LUN. Each logical unit LU can be divided into block—the smallest units for I/O acces—and each block is assigned a logical block address LBA. The host computer 3 can access the data stored in an arbitrary storage area in a specified logical unit LU by providing a logical address composed of a logical unit number LUN and a logical block address LBA to the first storage apparatus 5.

The first storage apparatus 5 also includes a plurality of disk drives—physical devices PDEV—and a disk controller 52 that controls the I/O access such as writing/reading of data to/from the disk drives 51. The disk drives 51 and the disk controller 52 are connected to each other via a disk channel 53.

The disk drives 51 are composed of storage media such as hard disk drives or non-volatile memories. They may form a RAID (Redundant Arrays of Independent Disks) structure.

The disk controller 52 includes channel adapters (CHA) 521, cache memory (CM) 522, disk adapters (DKA) 523, and shared memory (M) 524, and these modules or components are connected to one another via an interconnection unit 525. The respective modules may be structured with redundancy, in the form of two or more modules of each type.

Each channel adapter 521 is a system circuit having a plurality of ports (not shown in the drawing) and serving as a communication interface that communicates with the port-connected host computer 3 via the channel 2A in accordance with I/O access requests.

The cache memory 522 temporarily stores the data transmitted between the host computer 3 and the disk drives 51 in order to provide high system performance to the host computer 3. The cache memory 522 is used for data passing between the channel adapters 521 and the disk adapters 523. The data set stored in the cache memory 522 is usually expelled (destaged) from the cache memory 522 in accordance with, for example, an LRU algorithm. In this embodiment, via the cache residency function, data in a storage area in a logical device LDEV for which a cache residency setting is requested (residency setting target data) is written (staged) in the cache memory 522 and resides in the cache memory 522 without being expelled until a residency cancellation instruction is provided.

Each disk adapter 523 is also a system circuit having a plurality of ports (not shown in the drawing) and serving as an interface that controls the I/O access to the disk drives 51 connected to the ports via the disk channels 53. In other words, the disk adapter 523 takes data out of the cache memory 522 and stores it in the disk drive(s) 51, or, reads data from the disk drive(s) 51 and writes it in the cache memory 522. For example, in accordance with a residency setting instruction 80 from the channel adapter 521, the disk adapter 523 reads data (residency setting target data) from a storage area in a logical device LDEV and writes it in the cache memory 522. If there is a data that should be saved from the cache memory 522 (save target data), that data is stored in a storage area in a logical device LDEV before writing the above residency setting target data in the cache memory 522. The disk adapter 523 also stores, in accordance with a residency cancellation instruction 40, predetermined data in the cache memory 522 in a storage area in a logical device LDEV.

Figure 2:
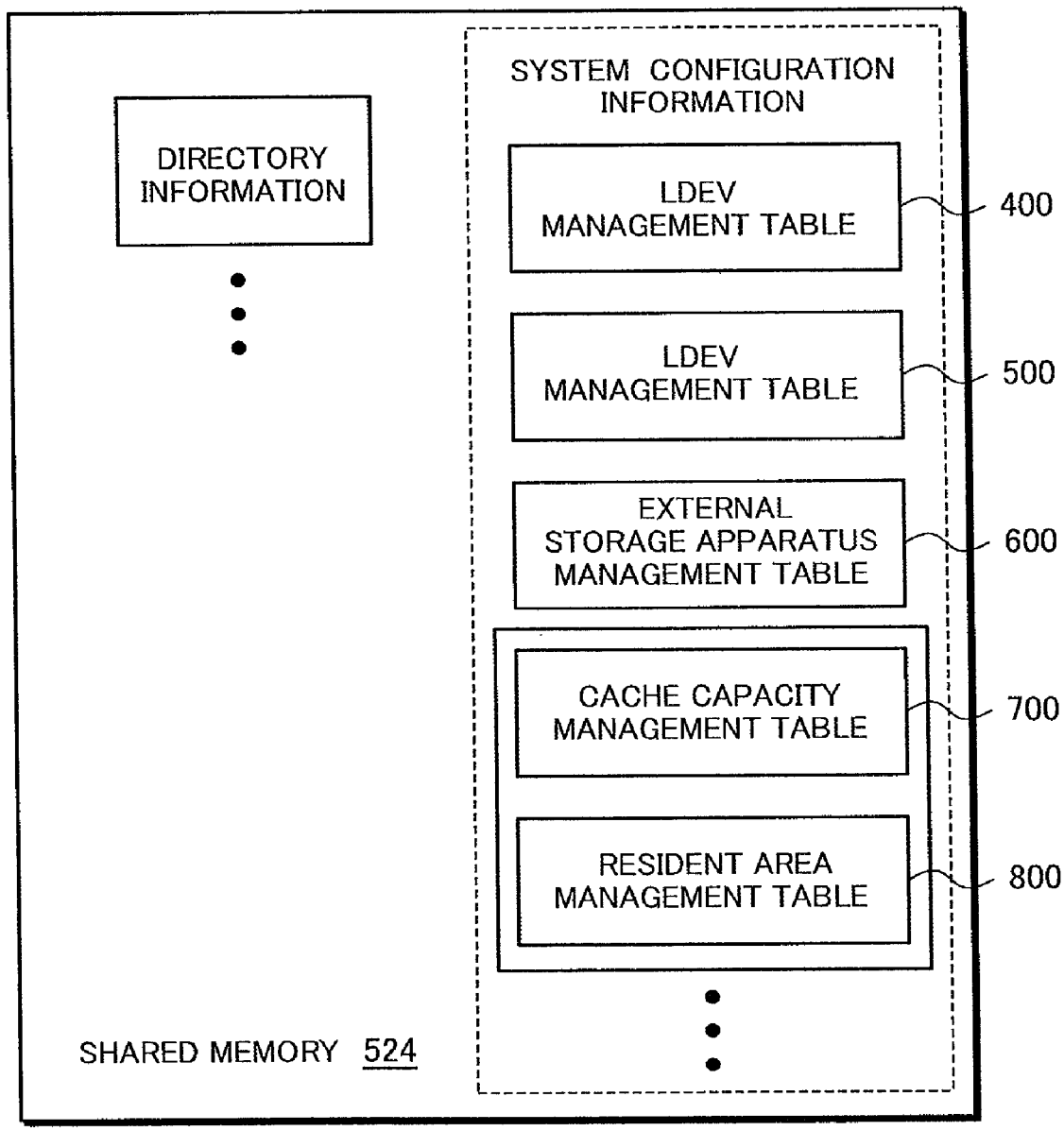
FIG. 2 is a diagram showing the content of a shared memory in a first storage apparatus according to an embodiment of the invention.

The shared memory 524 is a memory the respective modules in the first storage apparatus 5 refer to As shown in FIG. 2, the shared memory 524 stores, in relation to the first storage apparatus 5, cache operation directory information as well as system configuration information including various tables such as an LDEV management table 400, VDEV management table 500, external storage apparatus management table 600, cache capacity management table 700, and resident area management table 800. Details of these management tables 400-800 will be described later.

Returning to FIG. 1, the interconnection unit 525 is a switching device composed of a crossbar switch or the like. The interconnection unit 525 arbitrates the conflict of to-be-input data signals; switches paths for the data signals; and establishes paths from send source modules and send destination modules. The interconnection unit 525 may be a packet-switching device.

Figure 3:
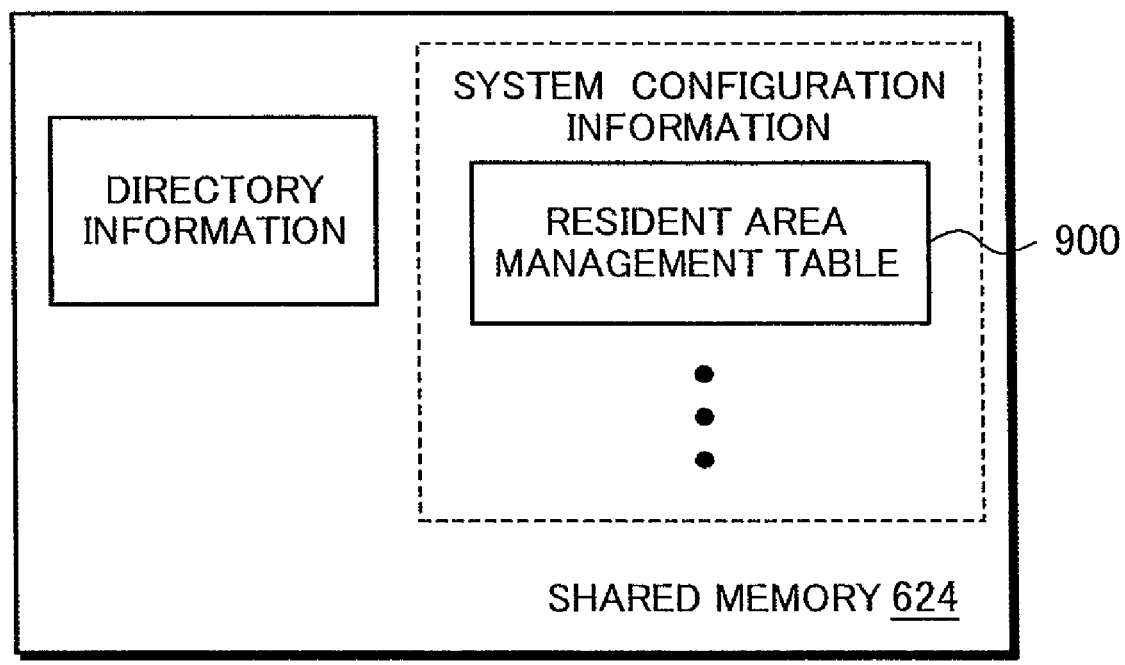
FIG. 3 is a diagram showing the content of a shared memory in a second storage apparatus according to an embodiment of the invention.

Each second storage apparatus 6a and 6b includes a plurality of disk drives 61 and a disk controller 62 that controls I/O access such as writing/reading of data to/from the disk drives 61. In this documents, the second storage apparatus 6a and the second storage apparatus 6b may be collectively called second storage apparatuses 6 when it is unnecessary to distinguish between them. The disk drives 61 and the disk controller 62 are connected to one another via a disk adapter 623. Because the basic structure of each second storage apparatus 6 is the same as that of the first storage apparatus 5, the explanation will be omitted. Each second storage apparatus 6 also has the cache residency function and is able to have data always reside in the cache memory 622. As shown in FIG. 3, the shared memory 624 in each second storage apparatus 6 stores cache operation directory information; and system configuration information including a residency management table 900 etc. The cache memory 622 and the shared memory 624 are coupled to an interconnection network 625 that has a function similar to interconnection network 525 in its relationship to the cache memory 522 and the shared memory 524.

The computer system 1 further includes a management device 7 that manages the entire storage system 4. The management device 7 is connected to the first storage apparatus 5 via a network, such as a LAN, which is established using, for example, Ethernet (registered trademark). In this embodiment, the management device 7 is also connected to the second storage apparatuses 6. Thus, the first storage apparatus 5 is capable of sending a residency setting instruction to the second storage apparatuses 6 via the management device 7. The management device 7 is typically a general computer and runs predetermined management programs under the control of its CPU in order to provide desired management services. In this embodiment, a system administrator (user) can set/cancel residency via a Web console provided on the management device 7.

FIG. 4 is a diagram showing an example of the LDEV management table 400 in the first storage apparatus 5 according to an embodiment of the invention. The LDEV management table 400 defines association relationships between the logical devices LDEV (internal logical devices LDEV-I) defined in the first storage apparatus 5 and a plurality of virtual devices VDEV provided by the group of disk drives in the entire storage system 4 (i.e., disk drives 51 and 61).

Referring to FIG. 4, the LDEV management table 400 has an internal LDEV number field 401 and a VDEV number field 402. The internal LDEV number field 401 shows the numbers uniquely assigned to the logical devices LDEV (internal logical devices LDEV-I) defined in the first storage apparatus 5. The VDEV number field 402 shows the numbers uniquely assigned to the virtual devices VDEV formed from the group of disk drives in the entire storage system 4. For example, the internal LDEV "x0000" is associated with the virtual device "x0000."

FIG. 5 is a diagram showing an example of the VDEV management table 500 in the first storage apparatus 5 according to an embodiment of the invention. The VDEV management table 500 defines association relationships between the virtual devices VDEV formed from the group of disk drives in the entire storage system 4 and the logical devices (external logical devices LDEV-E) defined in the external storage apparatuses, i.e., the second storage apparatuses 6. The VDEV management table 500 is set during device mapping processing performed when a second storage apparatus 6 is connected to the first storage apparatus 5.

As shown in FIG. 5, the VDEV management table 500 has a VDEV number field 501, external storage number field 502, and external storage LDEV number field 503. The VDEV number field 501 shows the numbers uniquely assigned to the virtual devices VDEV and is an equivalent of the VDEV number field in the LDEV management table 400 in FIG. 4. The external storage apparatus number field 503 shows the numbers uniquely identifying the second storage apparatuses 6 connected to the first storage apparatus 5. The value "0" registered in the external storage apparatus number field 503 indicates the first storage apparatus 5. The external storage apparatus LDEV number field 503 shows the numbers uniquely identifying the logical devices LDEV defined in the respective second storage apparatuses 6.

Accordingly, by referring to the LDEV management table 400 in FIG. 4 and the VDEV management table 500, it is possible to identify the logical devices LDEV that are allocated to the internal logical devices LDEV-I provided in the first storage apparatus 5. For example, the internal LDEV "x0006" registered in the LDEV management table 400 in FIG. 4 is associated with the logical device "x0100" in the second storage apparatus 6 having the external storage apparatus number "1." Thus, via access to the internal logical devices LDEV-I provided by the first storage apparatus 5, the host computer 3 can access the real logical devices LDEV (external logical devices LDEV-E) in the external storage apparatuses—second storage apparatuses 6—without being aware of their existence.

FIG. 6 is a diagram showing an example of the external storage apparatus management table 600 in the first storage apparatus 5 according to an embodiment of the invention. The external storage apparatus management table 600 is for managing the external storage apparatuse—the second storage apparatuses 6—and has an external storage apparatus number field 601, serial number field 602, number-of-paths field 603, and path number fields 604. In other words, the external storage apparatus management table 600 is for identifying the paths the first storage apparatus 5 uses when sending I/O access requests to specified second storage apparatuses 6.

The external storage apparatus number field 601 shows the numbers uniquely identifying the second storage apparatuses 6 connected to the first storage apparatus 5; and the serial number field 602 shows the serial numbers uniquely assigned to the second storage apparatuses 6. The number-of-paths field 603 shows the number of ports allocated to the respective second storage apparatuses 6. The path number fields 604 show the numbers uniquely identifying the ports allocated to each second storage apparatus 6. The number of path number fields 604 set for each second storage apparatus is the same as that registered in the number-of-paths field 603 for that second storage apparatus.

FIG. 7 is a diagram showing an example of the cache capacity management table 700 in the first storage apparatus 5 according to an embodiment of the invention. The cache capacity management table 700 is for managing the cache capacities and resident area sizes in the external storage apparatuses, i.e., the respective second storage apparatuses 6.

As shown in FIG. 7, the cache capacity management table 700 has a storage apparatus number field 701, cache capacity field 702, resident area size field 703, and number-of-resident areas field 704. The storage apparatus number field 701 shows the numbers uniquely identifying the storage apparatuses. The value "0" registered in the storage apparatus number field 701 indicates the first storage apparatus 5. The cache capacity field 702 shows the storage capacities (sizes) of the cache memory 622 in the respective second storage apparatuses 6. The resident area size field 703 shows the size of the areas, out of the total size of the cache memory 622, that are designated as resident areas. The number-of-resident areas field 704 shows the number of areas that are designated as resident areas.

Figure 8:
FIG. 8 is a diagram showing an example of a resident area management table in the first storage apparatus according to an embodiment of the invention.

FIG. 8 is a diagram showing an example of the resident area management table 800 in the first storage apparatus 5 according to an embodiment of the invention. The resident area management table 800 is for managing the resident areas in the cache memories 622 in the respective second storage apparatuses 6.

As shown in FIG. 8, the resident area management table 800 has an internal LDEV number field 802, start address field 803, end address field 804, area size field 805, and external storage number field 806, these fields being managed using sequential numbers 801. The internal LDEV number field 802 indicates the numbers of the internal logical devices LDEV-I managed in the first storage apparatus 5. The start address field 803 and end address field 804 show the start addresses and end addresses of the resident areas allocated to the internal logical devices LDEV-I; and the area size field 805 shows the sizes of the resident areas ascertained based on these addresses. The external storage apparatus number field 806 shows the storage apparatus numbers having the cache-resident internal logical devices LDEV The value "0" registered in the external storage apparatus number field 806 indicates the first storage apparatus 5.

For example, one can know that the cache-resident areas in the storage apparatus "0" (i.e., the first storage apparatus 5), which is registered in the cache capacity management table 700 in FIG. 7, are the resident areas registered with the sequential numbers "1" and "2" in the resident area management table 800 in FIG. 8.

FIG. 9 is a diagram showing an example of the resident area management table 900 in each second storage apparatus 6 according to an embodiment of the invention. The resident area management table 900 is for managing the resident areas in the cache memory 622 in the second storage apparatus 6. Each second storage apparatus 6 stores a resident area management table 900 in its own shared memory 624. The resident area management table 900 has almost the same structure as the resident area management table 800 in FIG. 8 but is different in that it does not have an external storage apparatus number field. As shown in FIG. 9, the resident area management table 900 has an internal LDEV number field 902, start address field 903, end address field 904, and area size field 905, these fields being managed using sequential numbers 901. The sum total of the area sizes shown in the resident area management tables 900 in the respective second storage apparatuses 6 is equal to the size of the resident areas in the first storage apparatus 5.

Figure 10:
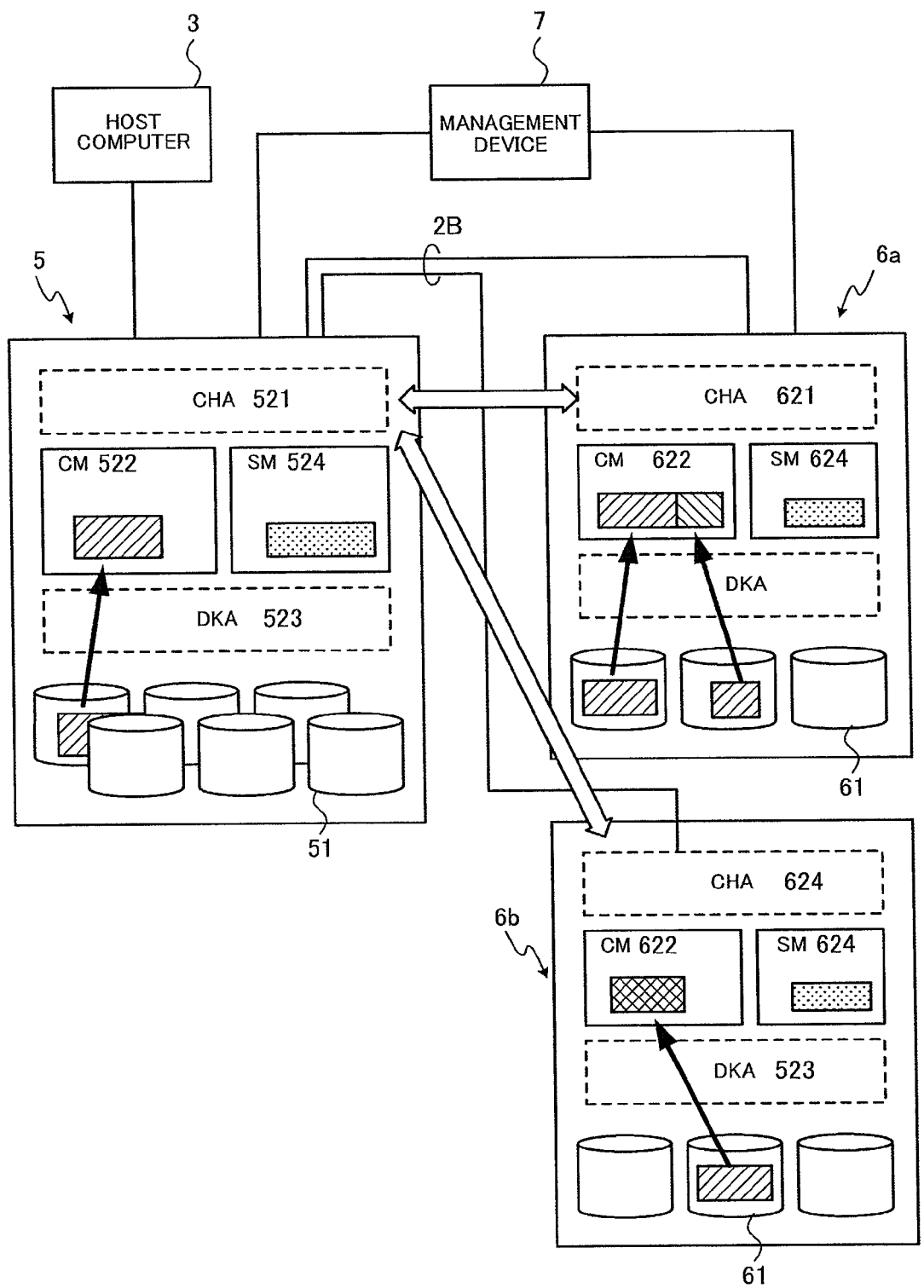
FIG. 10 is a conceptual diagram illustrating a cache residency function in a storage system according to an embodiment of the invention.

FIG. 10 is a conceptual diagram illustrating the cache residency function in the storage system 4 according to an embodiment of the invention. Although FIG. 10 shows a simplified form of the storage system 4 in FIG. 1, the structure is the same as above.

In the storage system 4 adopting the external storage connection configuration, the first storage apparatus 5 issues a cache residency setting (hereinafter simply called "residency setting") instruction to a second storage apparatus 6. Having received the instruction, the second storage apparatus 6 stages the data in a specified storage area in its own logical devices LDEV from the disk drive(s) 61 to a cache-resident area in its cache memory 622; and sends cache residency information to the first storage apparatus 5. The first storage apparatus 5 stores the residency information sent from the second storage apparatus 6 in its own shared memory 524.

Figure 11:
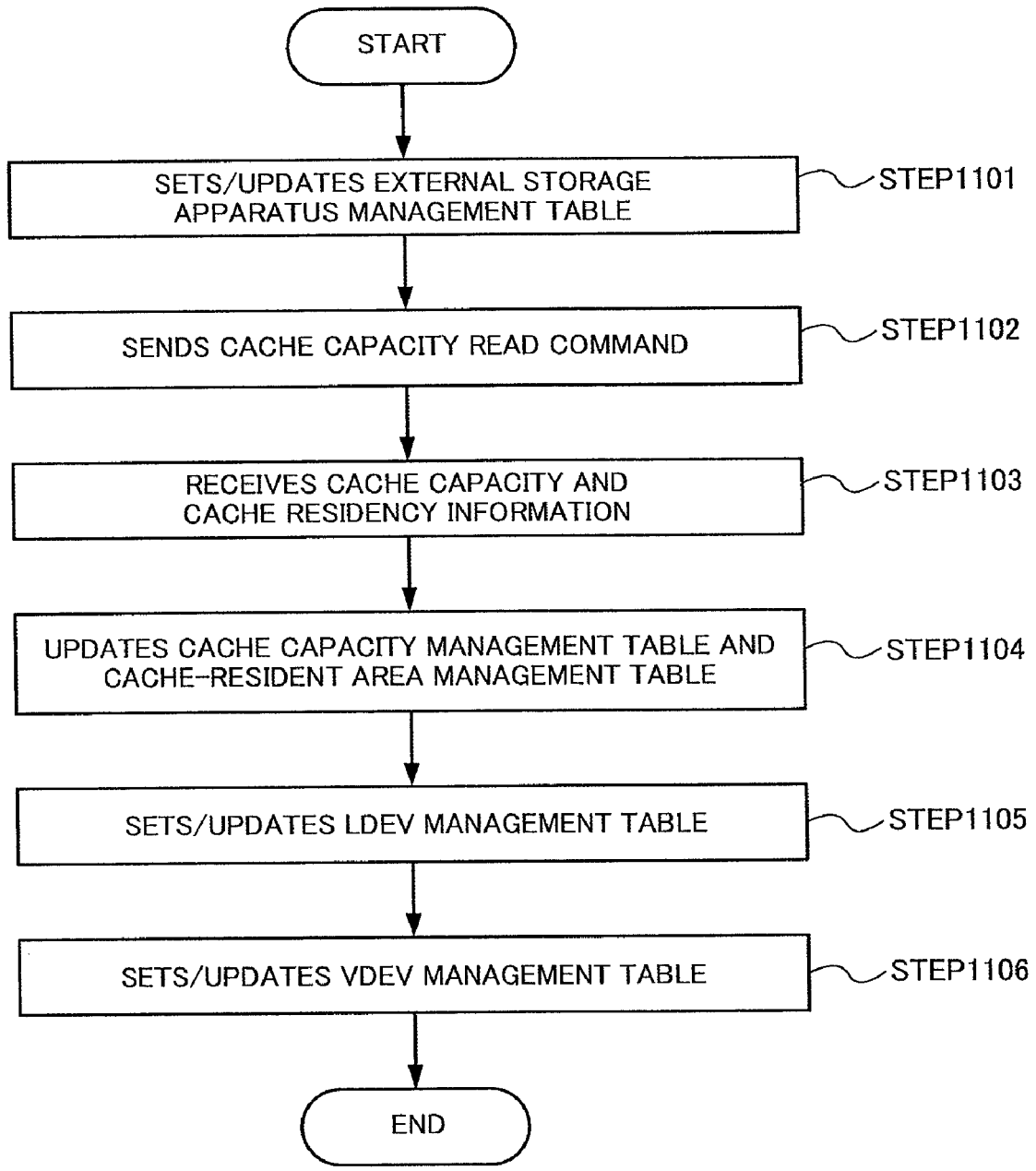
FIG. 11 is a flowchart for explaining the processing performed when establishing an external storage connection configuration in the storage system according to an embodiment of the invention.

FIG. 11 is a flowchart for explaining the processing performed when structuring the storage system 4 according to an embodiment of the invention.

First, a second storage apparatus 6 is connected to the first storage apparatus 5 via a Fibre cable, which serves as the second channel 2B. The first storage apparatus 5 ascertains the serial number of the second storage apparatus 6 via the Fibre cable; determines the number of paths and path numbers for the second storage apparatus 6; and registers these values in the external storage apparatus management table 600 in its shared memory 524 (STEP1101). Predetermined values may be used for the number of paths and path numbers, or values may be designated by the system administrator via the management device 7.

The first storage apparatus 5 then sends a cache capacity read command to the second storage apparatus 6 (STEP1102). Upon receipt of this command, the second storage apparatus 6 reads its cache capacity and residency information from its shared memory 624; and sends them to the first storage apparatus 5. The residency information is composed of LDEV numbers, start area addresses and end area addresses. The first storage apparatus 5 receives the cache capacity and residency information from the second storage apparatus 6 (STEP1103); and updates its cache capacity management table 700 and resident area management table 800 based on that information (STEP1104).

Then, in response to an instruction from the system administrator to allocate a virtual device VDEV to the internal logical devices LDEV, the first storage apparatus 5 updates its LDEV management table 400 (STEP1105). Also, in response to an instruction from the system administrator to allocate an external logical device to the virtual device VDEV, the first storage apparatus 5 also updates its VDEV management table 500 (STEP1106).

Figure 12:
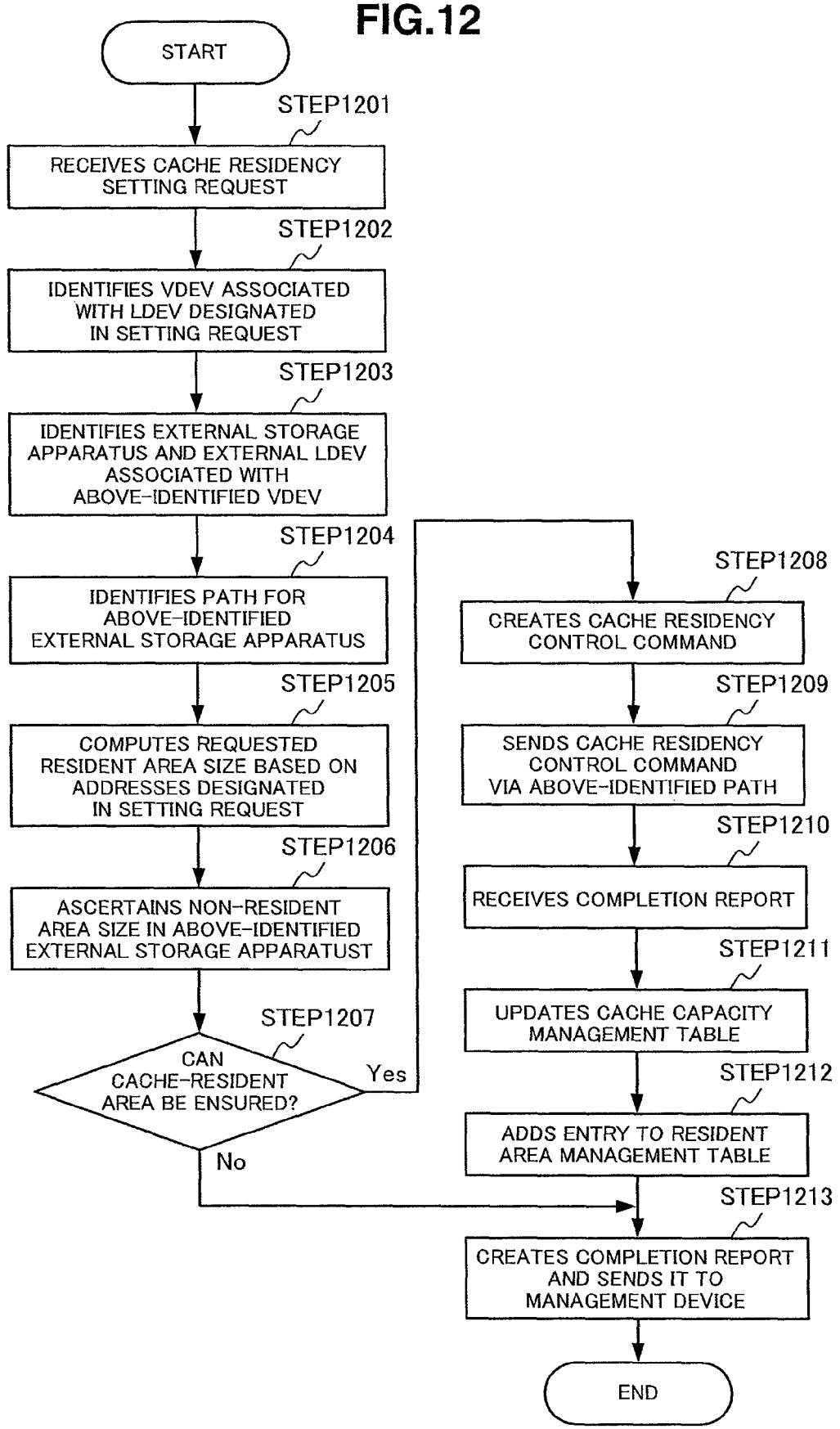
FIG. 12 is a flowchart for explaining the cache residency setting processing performed in the storage system according to an embodiment of the invention.
Figure 13:
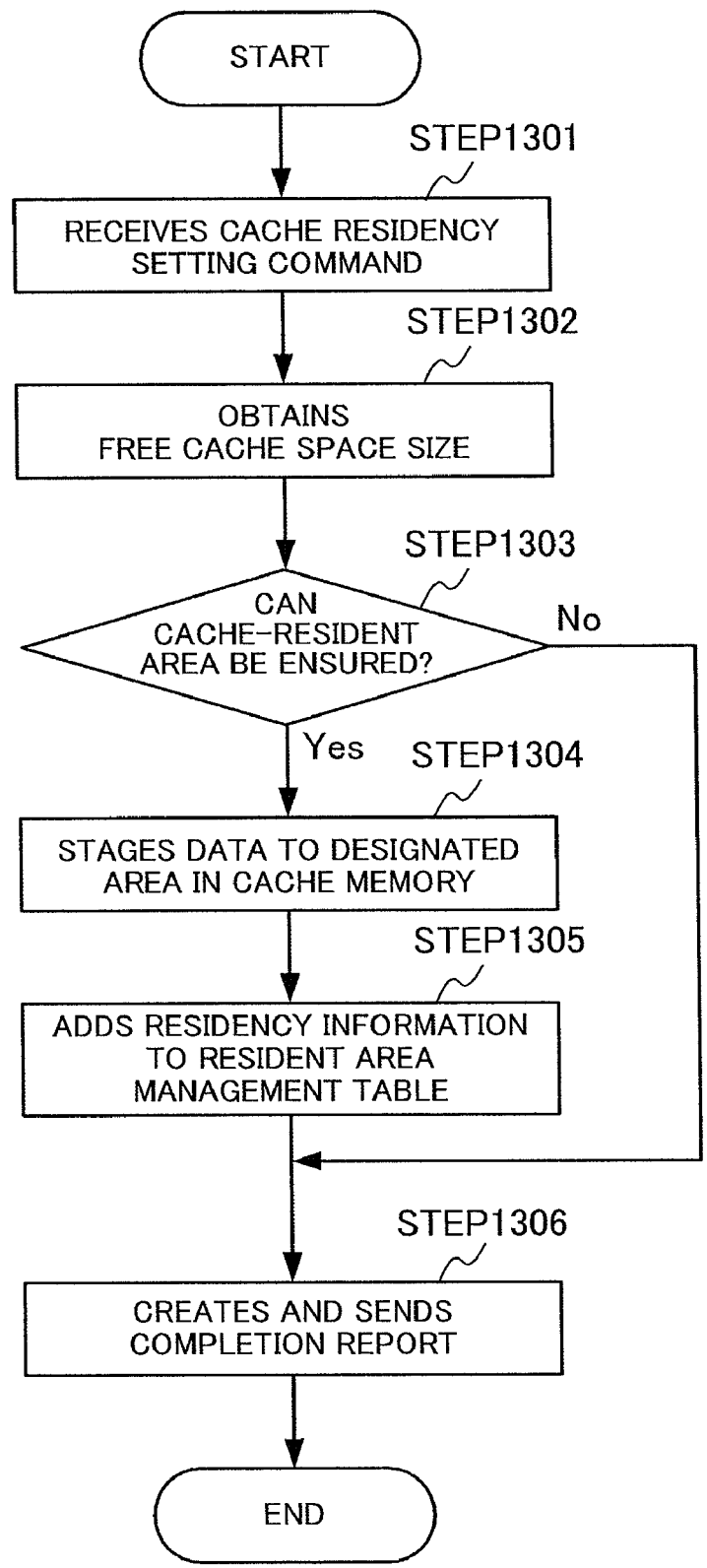
FIG. 13 is flowchart for explaining the cache residency setting processing performed in the storage system according to an embodiment of the invention.

FIGS. 12 and 13 are flowcharts for explaining cache residency setting processing performed in the storage system 4 according to an embodiment of the invention. More specifically, FIG. 12 shows the processing performed in the first storage apparatus 5 and FIG. 13 shows the processing performed in the second storage apparatus 6. Based on a cache residency setting instruction sent from the management device 7 via the first storage apparatus 5, a second storage apparatus 6 stages the data in the storage areas in a designated logical device LDEV to a resident area in its cache memory 622.

Figure 14:
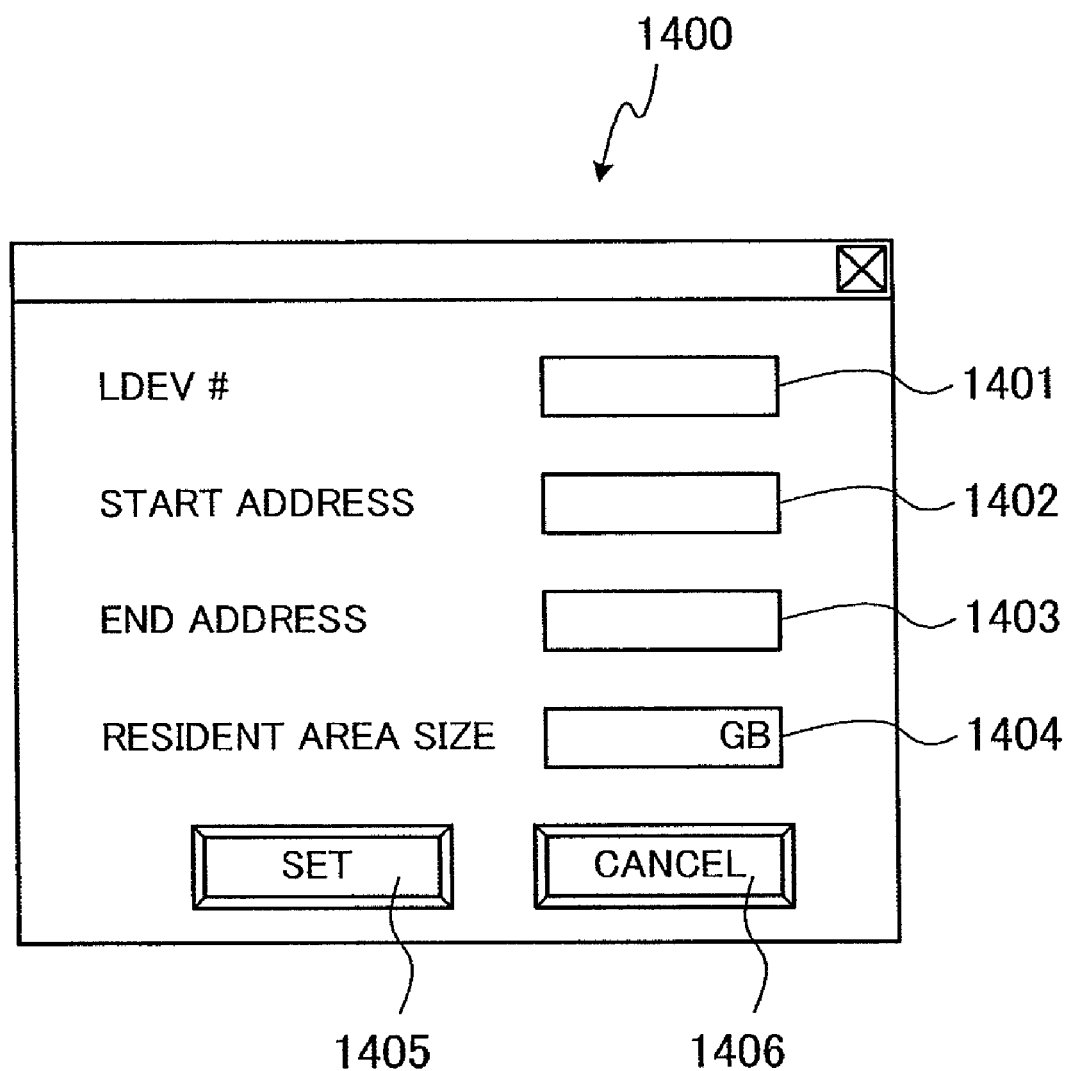
FIG. 14 is a diagram showing an example of a Web console on a management device according to an embodiment of the invention.
Figure 16:
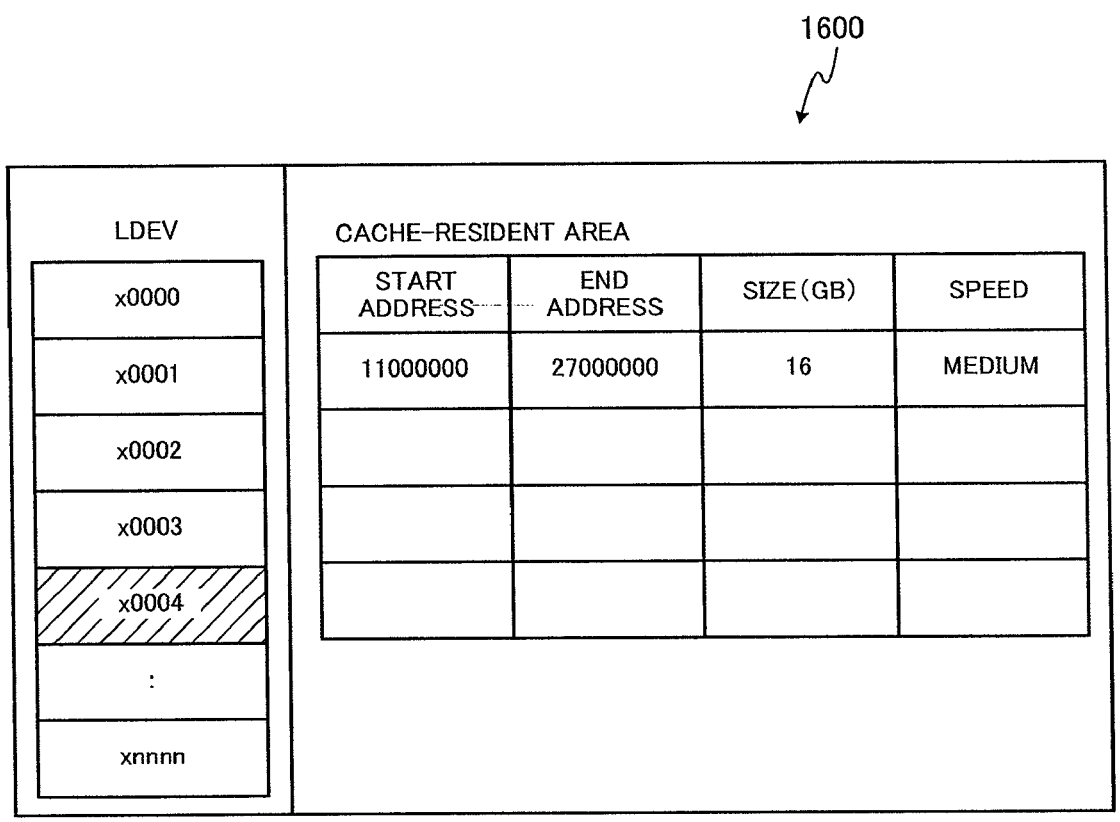
FIG. 16 is a diagram showing an example of a cache-resident area reference screen displayed on the management device according to an embodiment of the invention.

First, the system administrator sends a cache residency setting instruction to the first storage apparatus 5 via the Web console 1400 on the management device 7 shown in FIG. 14. More specifically, the system administrator inputs the LDEV number of a cache residency setting target in the LDEV number input field 1401; and inputs a start address in the start address input field 1402 and an end address in the end address input field 1403. The resident area size field 1404 is linked to the start address input field 1402 and end address input 1403, so the value computed based on the address values input in those fields is displayed in the resident area size field 1404. Alternatively, a configuration where an end address value is computed based on the input start address value and the resident area size may also be possible. After inputting required values in the Web console 1400, the system administrator selects a set button 1405, then the management device 7 creates a cache residency setting request based on the input values and sends it to the first storage apparatus 5. The process can be cancelled by using the cancel button 1406. Incidentally, when inputting values in the Web console 1400, the system administrator calls windows 1500 and 1600, such as the ones shown in FIGS. 15 and 16, respectively, to display them on the screen.

Upon receipt of the cache residency setting request (STEP1201), the first storage apparatus 5 identifies, with reference to its LDEV management table 400, the virtual device VDEV associated with the logical device LDEV designated in the setting request (STEP1202). The first storage apparatus then refers to its VDEV management table 500 to identify the external storage apparatus and external logical device LDEV that are associated with that virtual device VDEV (STEP1203). Subsequently, the first storage apparatus 5 identifies, with reference to its external storage apparatus management table 600, the path for the identified external storage apparatus (STEP1204).

The first storage apparatus 5 then computes the requested resident area size based on the start address and end address designated in the cache residency setting request (STEP1205). The first storage apparatus 5 then refers to its cache capacity management table 700 to ascertain the non-resident area size of the identified external storage apparatus (STEP1206) and checks whether or not it is possible to ensure a cache-resident area of the requested size (STEP1207). In other words, the first storage apparatus 5 determines that it can ensure a resident area if the requested resident area size is smaller than the value (non-resident area) remaining after subtracting the current resident area size from the cache capacity.

If the first storage apparatus 5 determines that the requested resident area cannot be ensured (STEP1207; No), the first storage apparatus 5 sends a completion report including an error status to the management device 7 (STEP1213). Upon receipt of this report, the management device 7 displays the error message on the Web console 1400.

If the first storage apparatus 5 determines the requested resident area can be ensured (STEP1207; Yes), the first storage apparatus 5 creates a cache residency control command such as the one shown in FIG. 17 (STEP1208) and sends it to the second storage apparatus 6 via the identified path (STEP1209). The cache residency control command includes a control code for residency setting or residency cancellation. A cache residency control command designating residency setting is called a cache residency setting command, and a cache residency control command designating residency cancellation is called a cache residency cancellation command.

Upon receiving the cache residency setting command (STEP1301 in FIG. 13), the second storage apparatus 6 refers to its resident area management table 900 to compute the free cache space size (non-resident area size) based on the cache capacity and the resident area size (STEP1302); and checks whether or not the requested resident area can be ensured (STEP1303). If the second storage apparatus 6 determines that the requested cache-resident area can be ensured (STEP1303; No), the second storage apparatus 6 sends a completion report including an error status to the first storage apparatus 5 (STEP1306).

If the second storage apparatus 6 determines that the requested cache-resident area can be ensured (STEP1303; Yes), the second storage apparatus 6 reads the data from the disk drive(s) 61 and stages it to the area in the cache memory 622 that is going to be set as a resident area (STEP1304). More specifically, the channel adapter 621 in the second storage apparatus 6 refers to the directory information in the shared memory 624 and stages the data stored in the predetermined storage areas in the disk drive(s) 61 to the storage area in the cache memory 622 that is going to be set as a resident area. It is noted that if other data is stored in the area that is going to be set as a cache-resident area, that other data may be destaged to the disk drive(s) 61. Subsequently, the second storage apparatus 6 updates the residency information in its resident area management table 900 (STEP1305); and sends a completion report including a normal status to the first storage apparatus 5 (STEP1306).

Upon receipt of the completion report including the normal status (STEP1210), the first storage apparatus 5 updates its cache capacity management table 700 (STEP1211). More specifically, the first storage apparatus 5 updates the resident area size field 703 and the number-of-resident areas field 704. Subsequently, the first storage apparatus 5 adds an entry for the newly-set cache-resident area to the resident area management table 800 (STEP1212). The first storage apparatus 5 then creates a completion report as a response to the cache residency setting request; and sends it to the management device 7 (STEP1213). If the first storage apparatus 5 receives a completion report including an error status, the first storage apparatus 5 notifies the management device 7 to that effect without updating its management tables 700 and 800.

Consequently, because a cache residency setting instruction is sent from the first storage apparatus 5 to the second storage apparatus 6, the user can have desired data reside in the cache memory 622 in the second storage apparatus 6 without being aware of the logical device numbers in that second storage apparatus 6.

Moreover, in the storage system 4 where the cache residency settings are made, the first storage apparatus 5 executes controls so that the data targeting its own logical device(s) LDEV is stored in its cache memory 522 on a priority basis. Accordingly, the first storage apparatus 5 can use its cache memory 522 effectively for its own logical devices LDEV.

In the above example, the system administrator issues a cache residency setting instruction via the management device 7; however, this invention is not limited to that case. Another configuration may also be adopted where control may be performed so that, for example, resident areas are set in advance and a timer is set, and when the timer reaches a designated time, the cache residency setting is performed. Alternatively, control may be performed so that a threshold value is set for the access frequency and, when the access frequency increases and exceeds that threshold value, the residency setting is performed.

Figure 18:
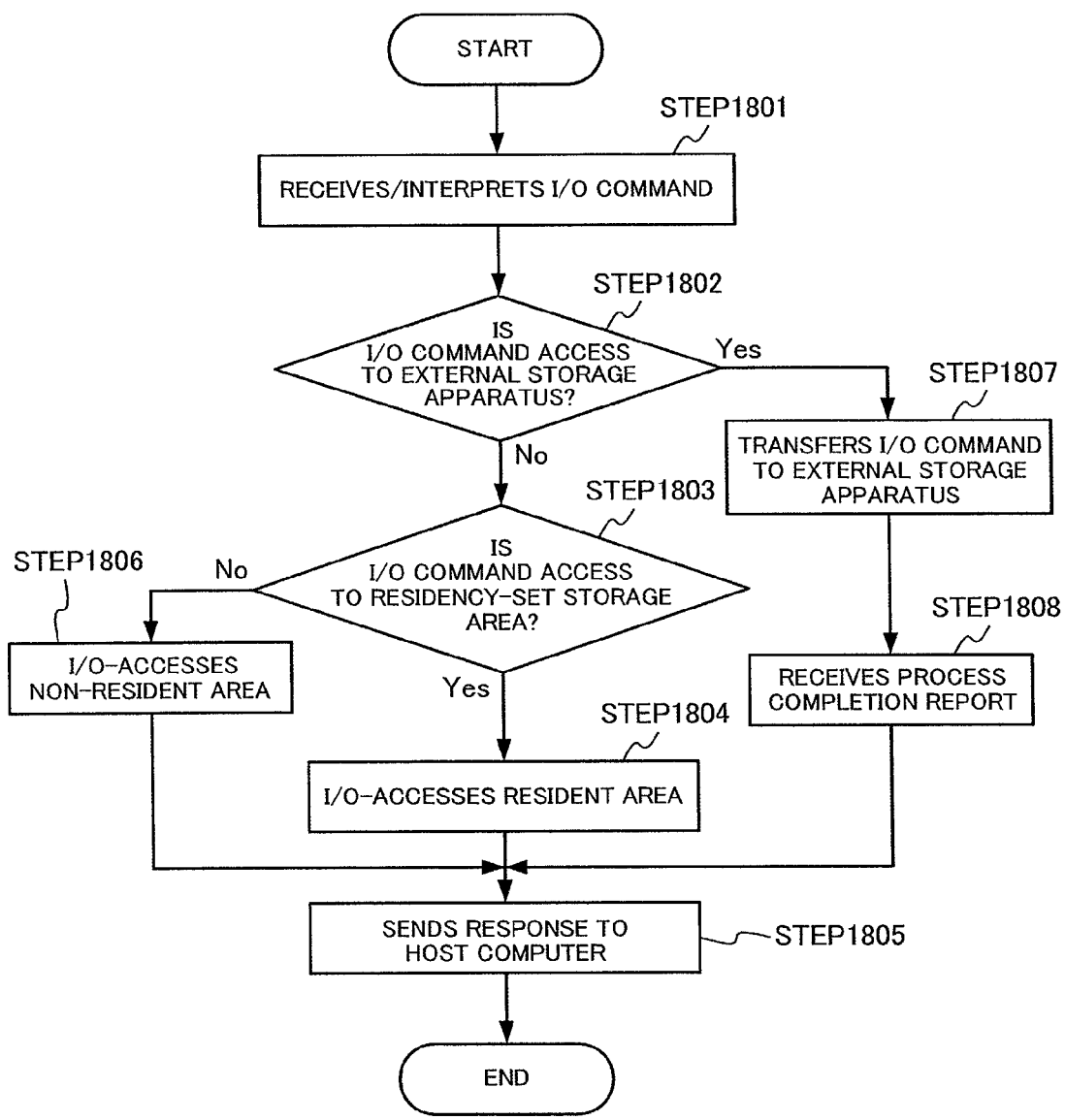
FIG. 18 is a flowchart for explaining the processing performed by a channel adapter in the first storage apparatus according to an embodiment of the invention.

FIG. 18 is a flowchart for explaining the processing performed by the channel adapter 521 in the first storage apparatus 5 according to an embodiment of the invention.

As shown in FIG. 18, the channel adapter 521 receives an I/O command from the host computer 3 and interprets it (STEP1801). The channel adapter 521 refers to the resident area management table 800 and determines whether or not the I/O command is targeting an external logical device LDEV (STEP1802). If the channel adapter 521 determines that the I/O command is not targeting an external logical device LDEV (STEP1802; No), it then judges whether or not the I/O command is an I/O access to a storage area in a residency-set (resident) logical device LDEV (STEP1803).

If the channel adapter 521 determines that the I/O command is an access to a storage area in a residency-set logical device LDEV (STEP1803; Yes), the channel adapter 521 I/O-accesses that resident area in the cache memory 522 (STEP1804); and sends a response to the host computer 3 in response to the I/O command (STEP1805). In the case of access to a residency-set storage area, I/O access-requested data always exists in the resident area, and thus the channel adapter 521 can respond to the host computer 3 immediately. In contrast, if the channel adapter 521 determines that the I/O command is not an access to a storage area in a residency-set logical device LDEV (STEP1803; No), the channel adapter 521 I/O-accesses a non-resident area (STEP1806). In this case, normal I/O processing is performed.

If the channel adapter 521 determines in STEP 1802 that the above I/O command is targeting an external logical device LDEV, the channel adapter 521 refers to the external storage apparatus management table 600 and transfers that I/O command to the second storage apparatus 6 that has the target external logical device LDEV, without storing it in the cache memory 522 (STEP1807). In this case, the channel adapter 521 waits for a completion report from that second storage apparatus 6 (STEP1808) and sends a response to the host computer 3 (STEP1805).

Upon receiving the transferred I/O command, the channel adapter 621 in the second storage apparatus 6 refers to its resident area management table 900 and performs the processing in the same way as above.

As described above, even when the first storage apparatus 5 frequently receives I/O commands targeting the second storage apparatuses 6, the first storage apparatus 5 can use the areas in its own cache memory 522 exclusively. Accordingly, the cache memory 522 in the first storage apparatus 5 can be used effectively and degradation in the system performance of the first storage apparatus 5 can be prevented, which consequently prevents degradation in the system performance of the entire storage system 4.

In the above example, control is performed so that the first storage apparatus 5 does not store the data targeting an external logical device LDEV in its cache memory 522. In the meantime, the invention does not exclude the case where control is performed so that the first storage apparatus 5 stores the data in its cache memory 522. It is preferable that a mechanism is introduced so that the cache memory 522 in the first storage apparatus 5 is used preferentially for the first storage apparatus 5.

With a normal cache function, data that has not been accessed for a long time is expelled from the cache memory in accordance with, for example, an LRU algorithm (or pseudo LRU algorithm). In This embodiment, the data stored in the non-resident area in the cache memory 522 is also destaged to the disk drive(s) 51 in accordance with the LRU algorithm.

Also, in this embodiment, the data targeting an external logical device LDEV is stored in the cache memory 522 using the queue method (or FIFO method). That is, the channel adapter 521 writes the data targeting the external logical device LDEV in the cache memory 522 and queues metadata for that data in the queue area in the cache memory 522. Regarding the metadata queued in the queue area, each time new metadata is written in the queue area, the oldest metadata in the queue area is expelled. The channel adapter 521 transfers the data related to the expelled metadata to its original second storage apparatus 6.

Figure 19:
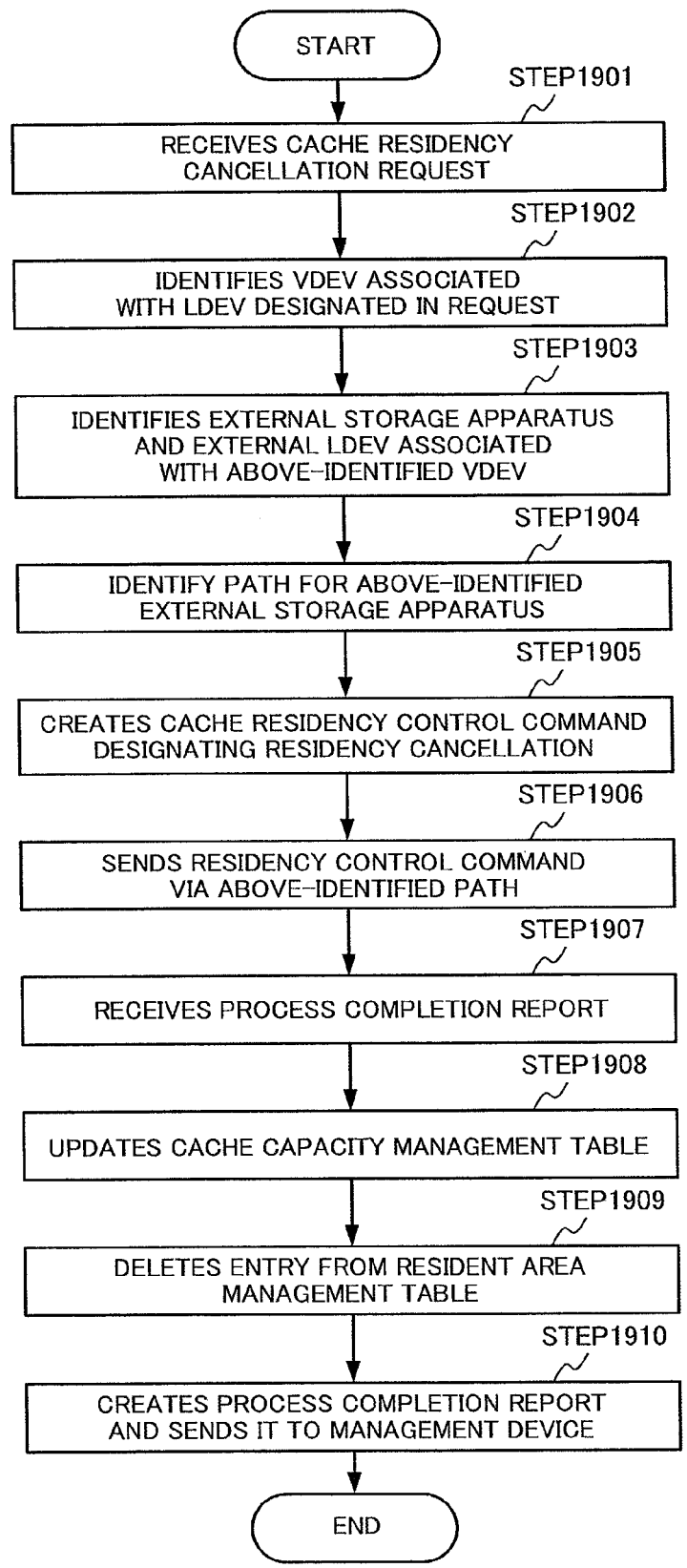
FIG. 19 is a flowchart for explaining residency cancellation processing performed in the storage system according to an embodiment of the invention.
Figure 20:
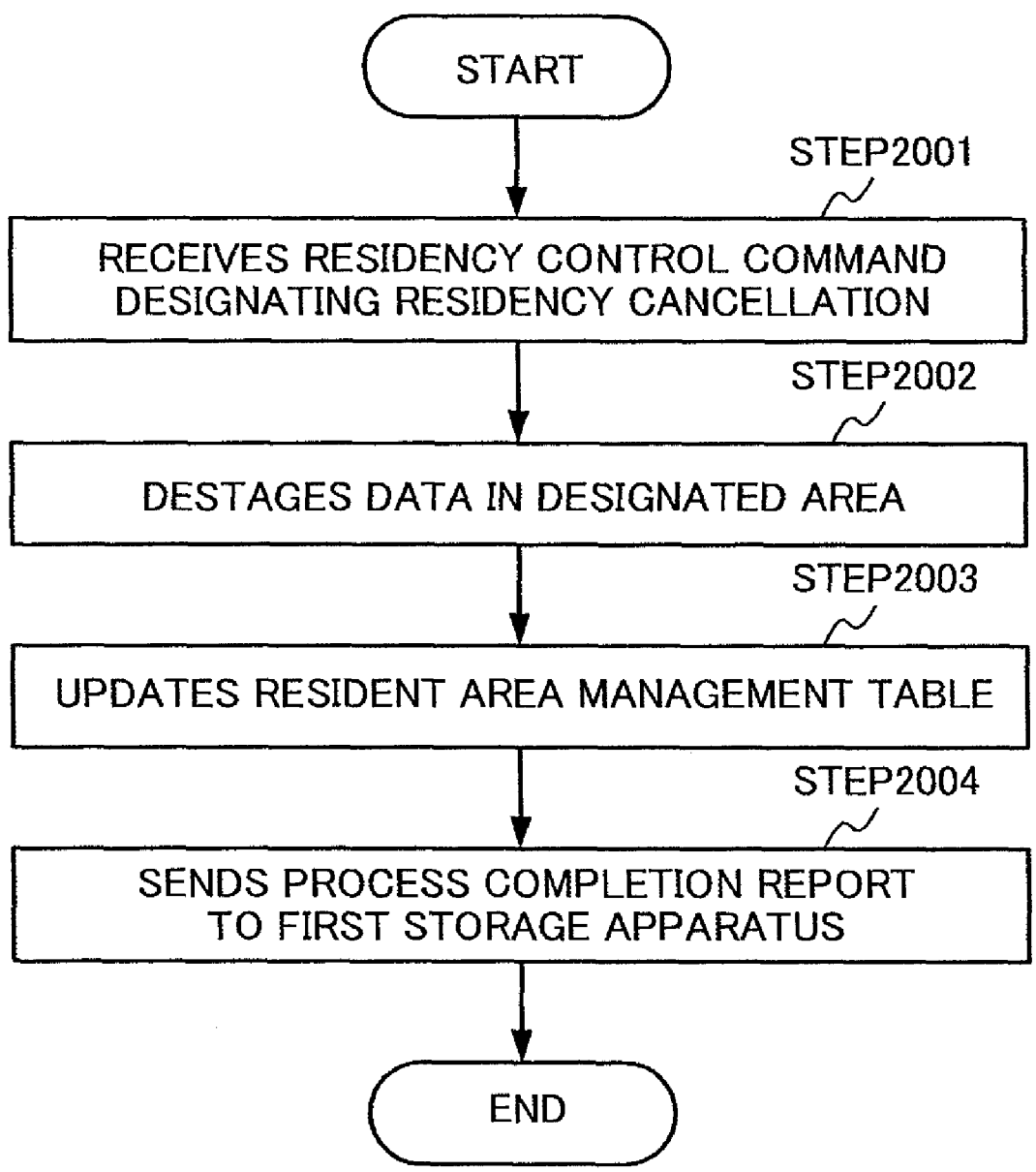
FIG. 20 is a flowchart for explaining residency cancellation processing performed in the storage system according to an embodiment of the invention.

FIGS. 19 and 20 are flowcharts for explaining residency cancellation processing performed in the storage system 4 according to an embodiment of the invention. More specifically, FIG. 19 shows the processing performed in the first storage apparatus 5 and FIG. 20 shows the processing performed in the second storage apparatus 6.

The system administrator issues a cancellation instruction to release the resident area for which the residency is currently set via the Web console on the management device 7. Upon receipt of the residency cancellation instruction via the Web console, the management device 7 sends a residency cancellation request to the first storage apparatus 5.

Upon receipt of the cache residency cancellation request (STEP1901), the first storage apparatus 5 identifies, with reference to its LDEV management table 400, the virtual device VDEV associated with the logical device LDEV designated in the cancellation request (STEP1902), and also identifies, with reference to its VDEV management table 500, the external storage apparatus and external logical device LDEV associated with the above-identified virtual device VDEV (STEP1903). Subsequently, the first storage apparatus 5 identifies, with reference to its external storage apparatus management table 600, the path for the above-identified external storage apparatus (STEP1904).

The first storage apparatus 5 then creates a cache residency control command designating residency cancellation (STEP1905) and sends it to the second storage apparatus 6 via the above-identified path (STEP1906).

Upon receipt of the cache residency control command designating residency cancellation (STEP2001), the second storage apparatus 6 destages the data in the cache-resident area designated in the control command to the disk drive(s) 61 (STEP2002). More specifically, the channel adapter 621 in the second storage apparatus 6 sends a destage request to the disk adapter 623 via the shared memory 624. Having received the destage request, the disk adapter 623 destages the data to the disk drive(s) 61.

After destaging is complete, the second storage apparatus 6 deletes the entry for the resident area from its resident area management table 900 (STEP2003) and sends a completion report including a normal status to the first storage apparatus 5 (STEP2004). If the destaging in the second storage apparatus 6 results in abnormal termination, the second storage apparatus 6 sends a completion report including an error status to the first storage apparatus 5.

Upon receipt of the process completion report from the second storage apparatus 6 (STEP1907), the first storage apparatus 5 updates its cache capacity management table 700 based on the completion report (STEP1908). More specifically, the first storage apparatus 5 updates the resident area size field 703 and number-of-resident areas field 704. Subsequently, the first storage apparatus 5 deletes the entry for the released cache-resident area from its resident area management table 800 (STEP1909). the first storage apparatus 5 then creates a completion report as a response to the residency cancellation request and sends it to the management device 7 (STEP1910).

Thus, in accordance with a residency cancellation request from the Web console on the management device 7, the first storage apparatus 5 can release the cache-resident area in the second storage apparatus 6.

In the above example, a residency cancellation request is made by the system administrator via the Web console. However, this invention is not limited to this case. For example, control may be performed so that a validity period may be set for each resident area so that those resident areas whose validity has expired are released. Alternatively, control may be performed so that a threshold value is set for the access frequency of each resident area and when the access frequency of a resident area falls below the threshold value, that resident area is released.

Embodiment 2

Figure 21:
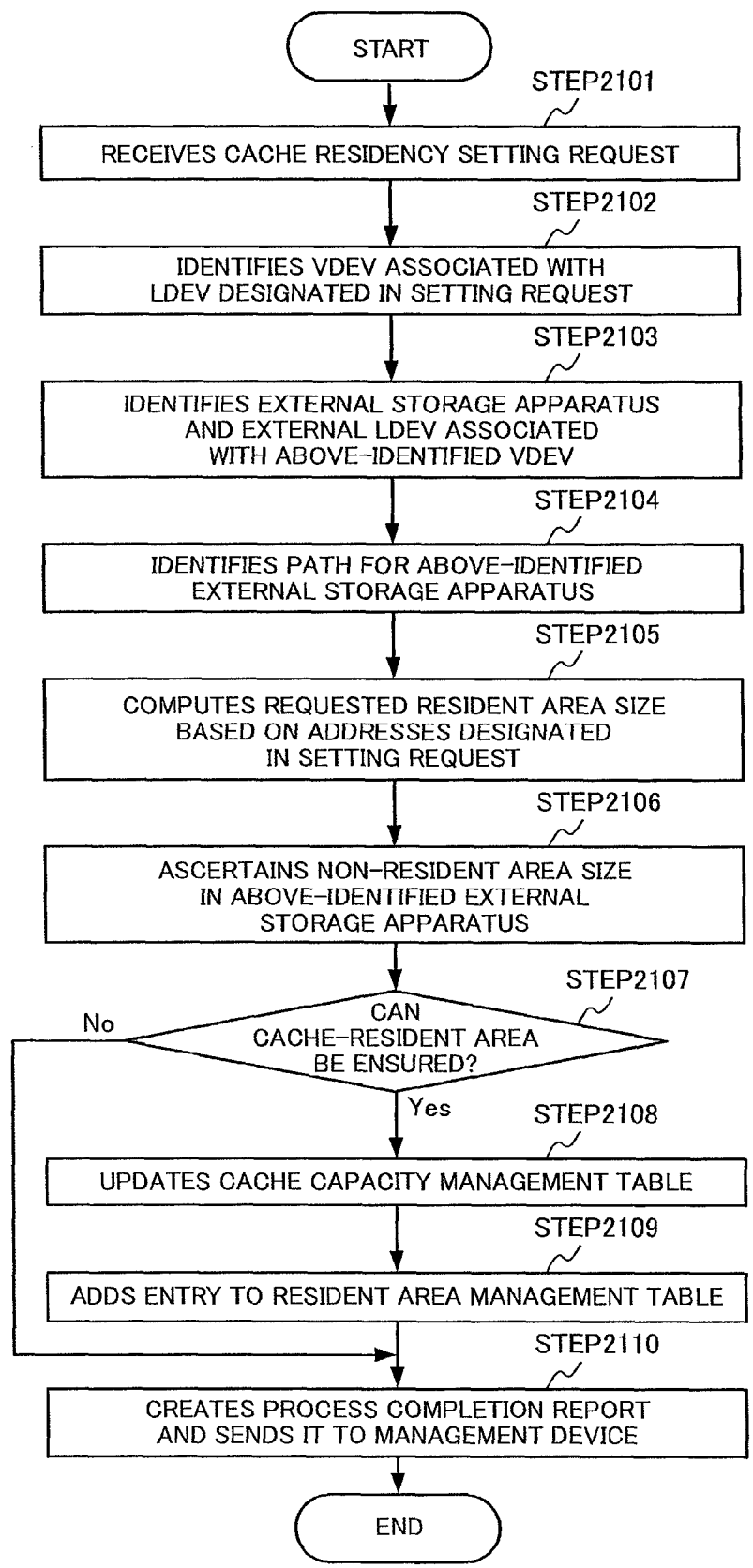
FIG. 21 is a flowchart for explaining residency setting processing performed in the storage system according to an embodiment of the invention.

FIG. 21 is a flowchart for explaining residency setting processing performed in the storage system 4 according to an embodiment of the invention. In this embodiment, the storage system 4 controls cache residency using I/O commands from the host computer 3.

Prior to receiving an I/O command from the host computer 3, the first storage apparatus 5 performs the above-described cache residency setting processing in response to a cache residency setting instruction from the system administrator via the web console 1400 on the management device 7. STEPS 2101-2107 in FIG. 21 are the same as STEP 1201-1207 in FIG. 12 so their explanations have been omitted.

In STEP2107, if the first storage apparatus 5 determines that a cache-resident area can be ensured, the first storage apparatus 5 updates the resident area size and the number-of-resident areas in its cache capacity management table 700 (STEP2108), and adds an entry for the newly set cache-resident area in its resident area management table 800 (STEP2109). The first storage apparatus 5 then creates a completion report in response to the residency setting request and sends it to the management device 7 (STEP2110).

Figure 22:
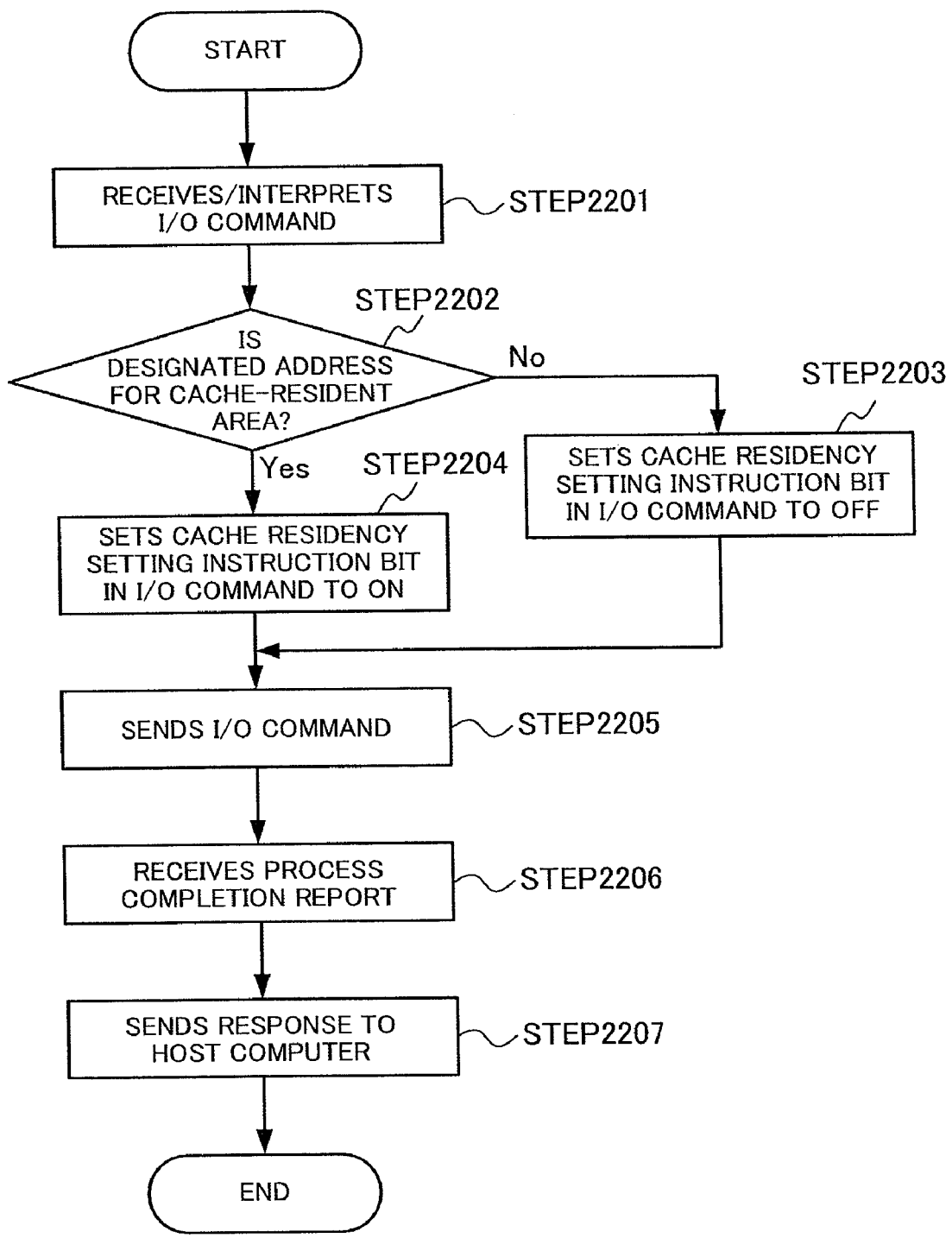
FIG. 22 is a flowchart for explaining cache residency control performed in the storage system according to an embodiment of the invention.
Figure 23:
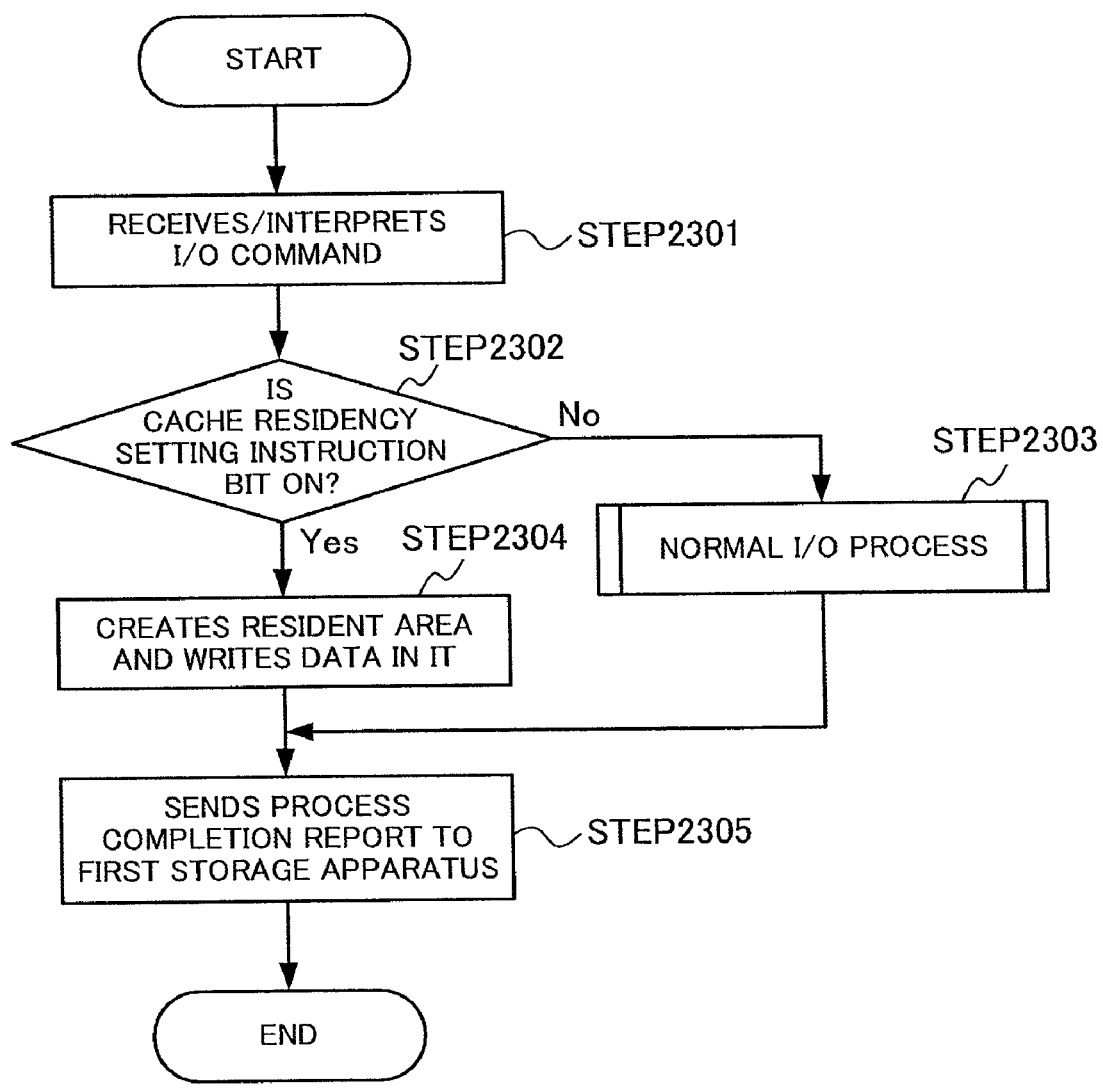
FIG. 23 is a flowchart for explaining cache residency control performed in the storage system according to an embodiment of the invention.
Figure 24:
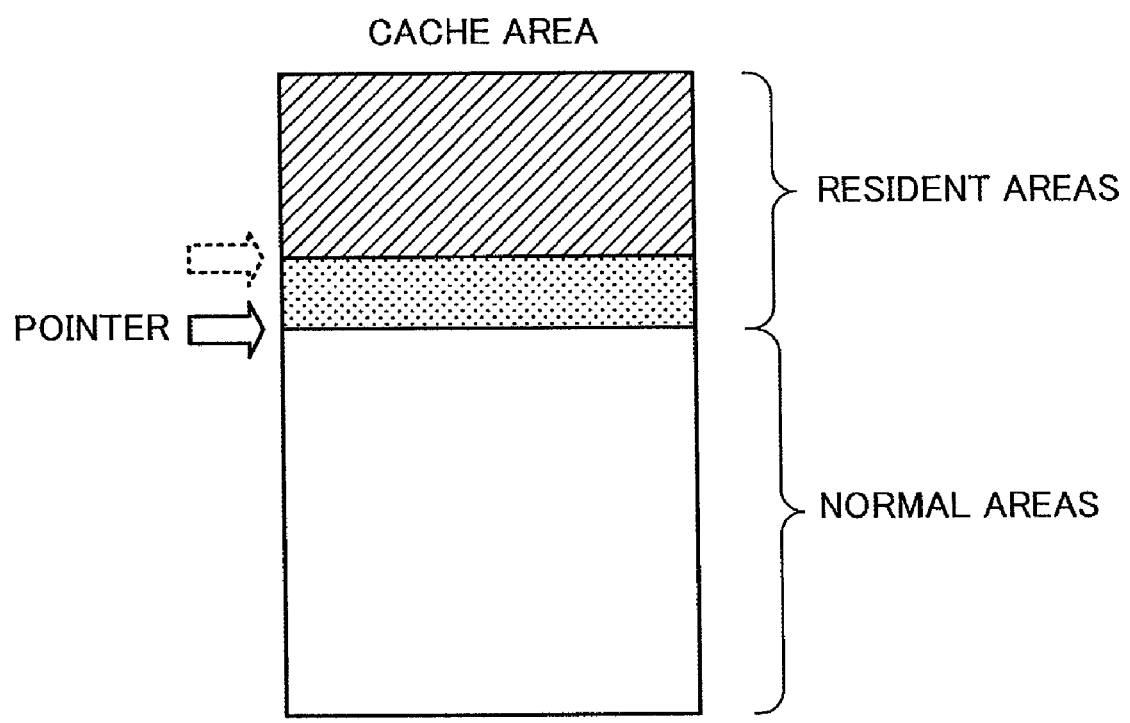
FIG. 24 is a diagram illustrating the usage state of the cache memory in the second storage apparatus according to an embodiment of the invention.

FIGS. 22 and 23 are flowcharts for explaining the cache residency control performed in the storage system 4 according to an embodiment of the invention. More specifically, FIG. 22 shows the processing performed in the first storage apparatus 5 and FIG. 23 shows the processing performed in the second storage apparatus 6.

First, as shown in FIG. 22, the first storage apparatus 5 receives an I/O command from the host computer 3 and interprets it (STEP2201). The first storage apparatus 5 then refers to its resident area management table 800 to determine whether or not the logical address designated in the I/O command is for a cache-resident area (STEP2202).

If the first storage apparatus 5 determines that the logical address is not for a cache-resident area, the first storage apparatus 5 sets the cache residency setting instruction bit in the I/O command to OFF (STEP2203); and sends the I/O command to the target second storage apparatus 6 (STEP2205). In contrast, if the first storage apparatus 5 determines that the logical address is for a cache-resident area, the first storage apparatus 5 sets the cache residency setting instruction bit in the I/O command to ON (STEP2204), and sends the I/O command to the target second storage apparatus 6 (STEP2205).

The first storage apparatus 5 then receives a completion report from the second storage apparatus 6 in accordance with the process shown in FIG. 23, which will be described later (STEP2206), and sends a response to the host computer 3 in response to the host computer's I/O command (STEP2207).

Upon receipt of the I/O command including the cache residency setting instruction bit from the first storage apparatus 5, the second storage apparatus 6 interprets it (STEP2301 in FIG. 23), and determines whether or not the I/O command's cache residency setting instruction bit is ON (STEP2302).

If the second storage apparatus 6 determines that the I/O command's cache residency setting instruction bit is OFF, the second storage apparatus 6 performs normal I/O processing (STEP2303). In other words, for example, if the I/O command is a data write request, the channel adapter 621 in the second storage apparatus 6 stores the data in a normal area (non-resident area) in its cache memory 622. The disk adapter 623 then destages the data stored in the non-resident area at an arbitrary time and stores it in the disk drive(s) 61. When the normal I/O process is complete, the second storage apparatus 6 sends a completion report to the first storage apparatus 5 (STEP2305).

If the second storage apparatus 6 judges that the I/O command's cache residency setting instruction bit is ON, it stores the data associating with the I/O command in its cache-resident area (STEP2304). In this embodiment, the cache-resident area expands with the increase in resident data to be written. In other words, each time a request to write resident data is made, an unused non-resident area is changed to a resident area.

When data writing in the cache-resident area is complete, the second storage apparatus 6 sends a process completion report to the first storage apparatus 5 (STEP2305).

Embodiment 3

In this embodiment, the residency setting instruction is issued using the host computer 3.

Figure 25:
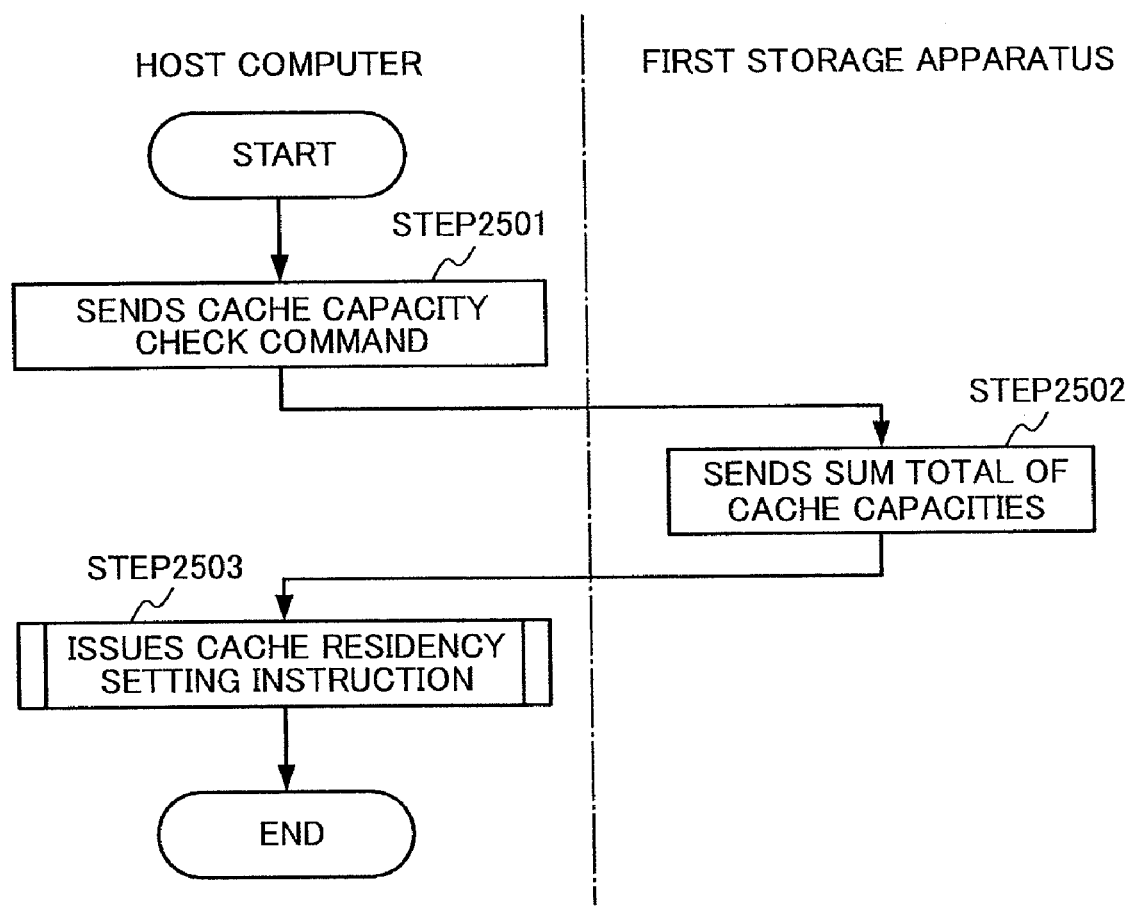
FIG. 25 is a flowchart for explaining a cache residency setting instruction issued in the storage system according to an embodiment of the invention.

FIG. 25 is a flowchart for explaining the cache residency setting instruction issued in the storage system 4 according to an embodiment of the invention.

As shown in FIG. 25, the host computer 3 sends a cache capacity check command to the first storage apparatus 5 (STEP2501). Upon receiving this command, the first storage apparatus 5 refers to its cache capacity management table 700 to ascertain the value of the sum total of the cache sizes in the respective second storage apparatuses 6; and sends it to the host computer 3 (STEP2502). The host computer 3 issues a cache residency setting instruction depending on the total sum of the cache sizes (STEP2503).

Accordingly, the system administrator can make cache residency settings using the host computer 3, without involving the management device 7, for the cache memories 622 in all the second storage apparatuses 6, which are established as external storage apparatuses.

Embodiment 4

This embodiment provides a storage system 4 with a cache residency function that uses a data attribute. The data attribute may refer to the information for the data access frequency or the response speed to data access the user expects. In this embodiment, the data attribute is defined as three categories; "high speed," "medium speed," and "low speed".

Figure 26:
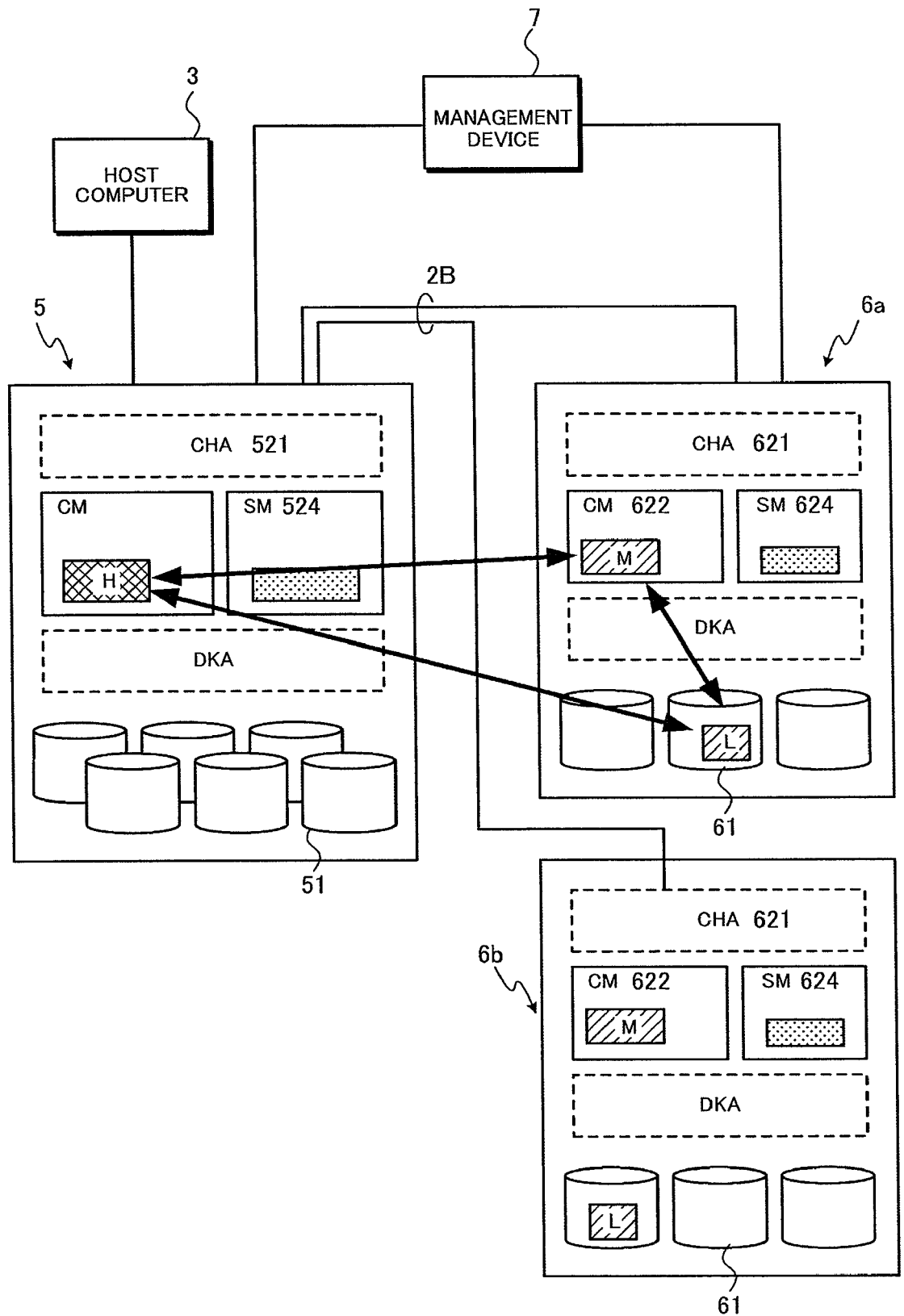
FIG. 26 is a conceptual diagram illustrating the cache residency function in the storage system according to an embodiment of the invention.

FIG. 26 is a conceptual diagram illustrating the cache residency function in the storage system 4 according to an embodiment of the invention. Although it shows a simplified form of the storage system 4 in FIG. 1, the structure is the same.

In the storage system 4 according to this embodiment, data attributes are set for the cache-resident areas. Residency setting target data is stored in a cache-resident area in an appropriate storage apparatus, according to the data attribute of the cache-resident area. If this kind of residency setting is performed during operation, the first storage apparatus 5 can perform control so that data is migrated between the first storage apparatus 5 and second storage apparatuses 6 depending on the data attributes. In order to manage these data attributes, a resident area management table 800' such as the one shown in FIG. 27 is prepared. This resident area management table 800' includes a process speed field 807.

Figure 28:
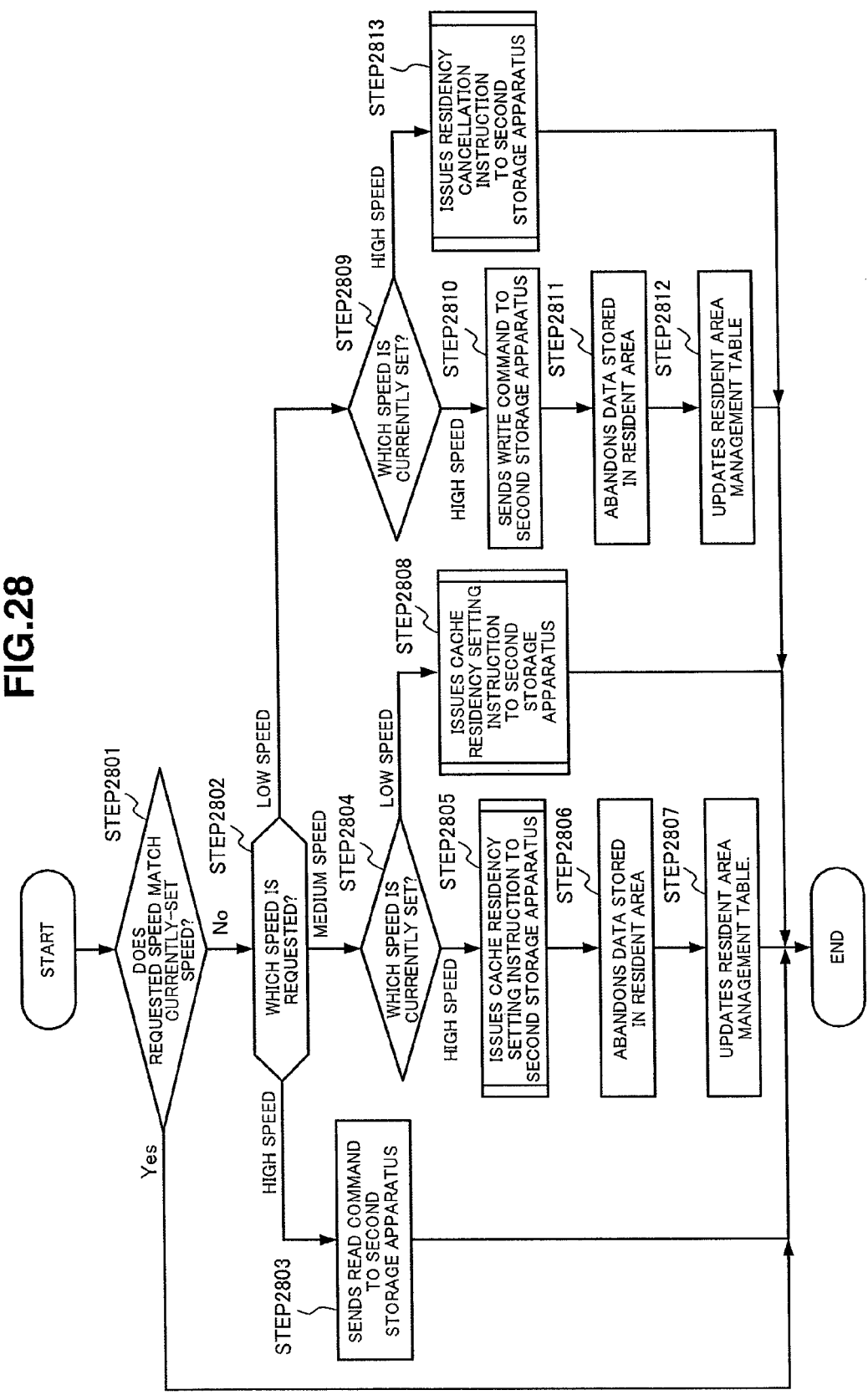
FIG. 28 is a flowchart for explaining the residency control performed in the storage system according to an embodiment of the invention.

FIG. 28 is a flowchart for explaining the residency control performed in the storage system 4 according to an embodiment of the invention.

Figure 29:
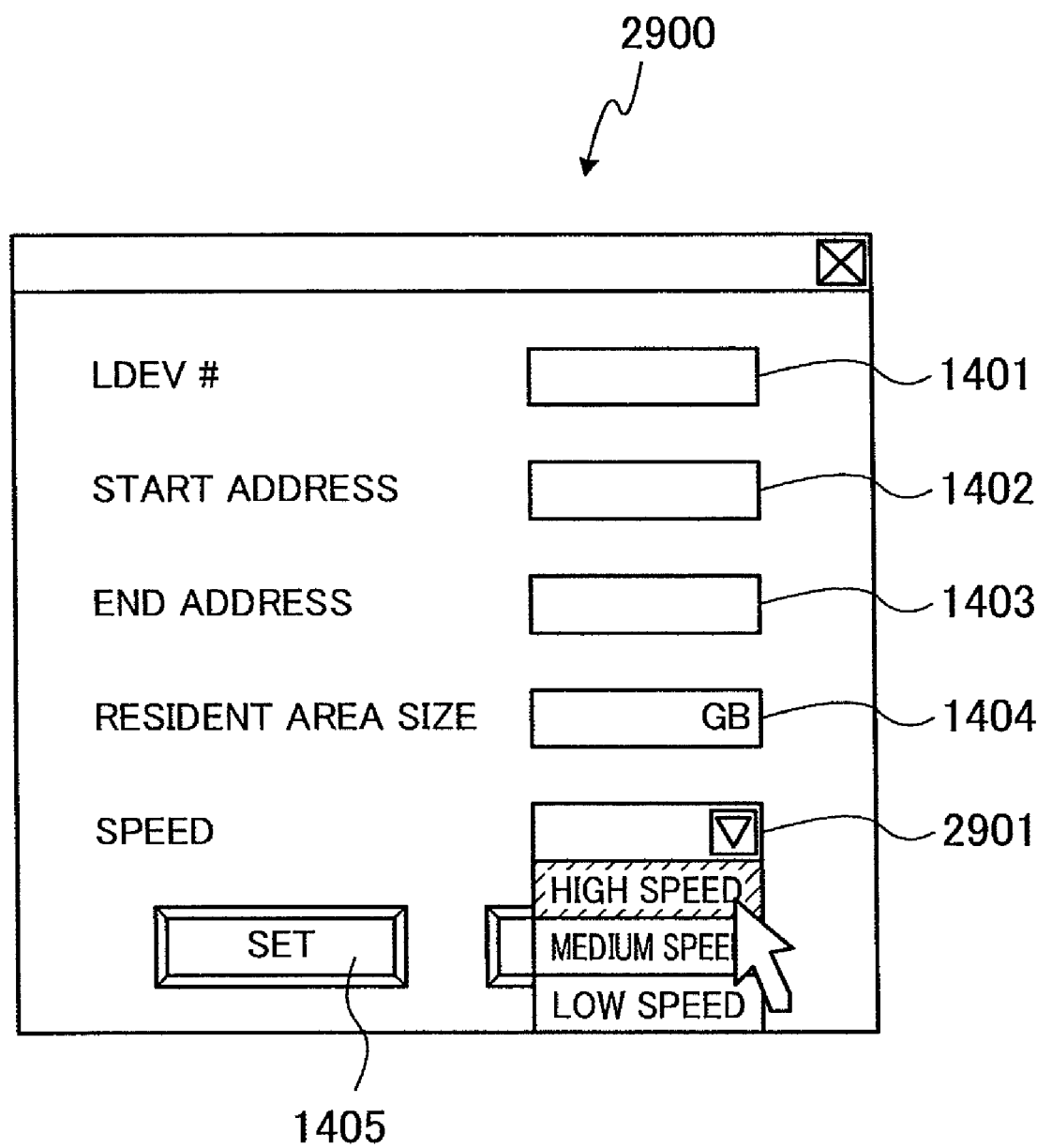
FIG. 29 is a diagram showing an example of the Web console on the management device according to an embodiment of the invention.

The system administrator is capable of setting a data attribute for each resident area via the web console 2900 shown in FIG. 29. Thus, the web console 2900 includes a data speed input field 2901 for the user to designate a data attribute. When the system administrator issues a residency setting instruction while inputting a data attribute and other values, the management device 7 sends a residency setting request to the first storage apparatus 5.

Upon receiving the residency setting request including the data attribute, the first storage apparatus 5 refers to its resident area management table 800' in FIG. 27 to determine whether or not the requested speed set for the resident area matches the currently-set speed (STEP2801). If the first storage apparatus 5 determines that the requested speed matches the currently-set speed (STEP2801; Yes), the first storage apparatus 5 just terminates the process without doing anything.

If the requested speed for the resident area does not match its currently-set speed (STEP2801; No), the first storage apparatus 5 proceeds to a branched process where it performs different processing depending on the requested speed (STEP2802).

If the requested speed is "high speed," the first storage apparatus 5 identifies the external storage number associated with the designated logical device LDEV, creates a residency control-related read command, and sends it to the second storage apparatus 6 having the above-identified external storage apparatus number (STEP2803). The residency control-related read command includes cache residency cancellation instruction information. Having received this command, the second storage apparatus 6 reads the data designated in the read command and sends it to the first storage apparatus 5. The second storage apparatus 6 then destages the data stored in its logical device LDEV.

If the requested speed is "medium speed," the first storage apparatus 5 proceeds to a branch judgment step to perform the processing appropriate for the currently-set speed (STEP2804). That is, if the currently-set speed is "high speed," the first storage apparatus 5 issues a residency setting instruction to a second storage apparatus 6 (STEP2805). The first storage apparatus 5 then abandons the data stored in the resident area in its cache memory 522 (STEP2806), and updates its resident area management table 800' (STEP2807). In other words, the value in the relevant current speed field in the resident area management table 800' is changed from "high speed" to "medium speed." Meanwhile, if the current speed is "low speed," the first storage apparatus 5 just issues a residency setting instruction to the current second storage apparatus 6 (STEP2808).

If the requested speed is "low speed," the first storage apparatus proceeds to a branch judgment step to perform the processing appropriate for the currently-set speed (STEP2809). If the requested speed is "low speed" and the currently-set speed is "high speed," the first storage apparatus 5 sends, to a second storage apparatus 6, a command to write the data in a resident area in the cache memory 622 (STEP2810). Subsequently, the first storage apparatus 5 abandons the data stored in the resident area in its cache memory 522 (STEP2811) and updates its resident area management table 800' (STEP2812). In contrast, if the currently-set speed is "medium speed," the first storage apparatus 5 issues a residency cancellation instruction to the current second storage apparatus 6 (STEP2813).

As described above, according to this embodiment, because a residency setting instruction is issued, from the Web console, with a data attribute—"high speed," "medium speed," or "low speed"—designated, the data in a designated logical device LDEV can be stored in a cache-resident area in an appropriate storage apparatus. Moreover, if this kind of residency setting is performed during operation, the target data is migrated between the first storage apparatus 5 and second storage apparatuses 6 depending on its data attribute. Thus, the storage system 4 can respond at the speed expected by the user.

In the above example, categories for the data attribute are set based on the response speed expected by the user. Alternatively, data attributes may be set based on parameters such as I/O access amounts monitored by the channel adapter 521. The channel adapter 521 may perform residency control based on the categories—"high speed," "medium speed," and "low speed"—that are set in accordance with the I/O access amount for a certain period of time.

Embodiment 5

In this embodiment, if the cache memory 622 in an external storage apparatus—second storage apparatus 6—does not have sufficient free spaces to use as resident areas, a free space in the cache memory 622 in another second storage apparatus 6 is used.

Figure 30:
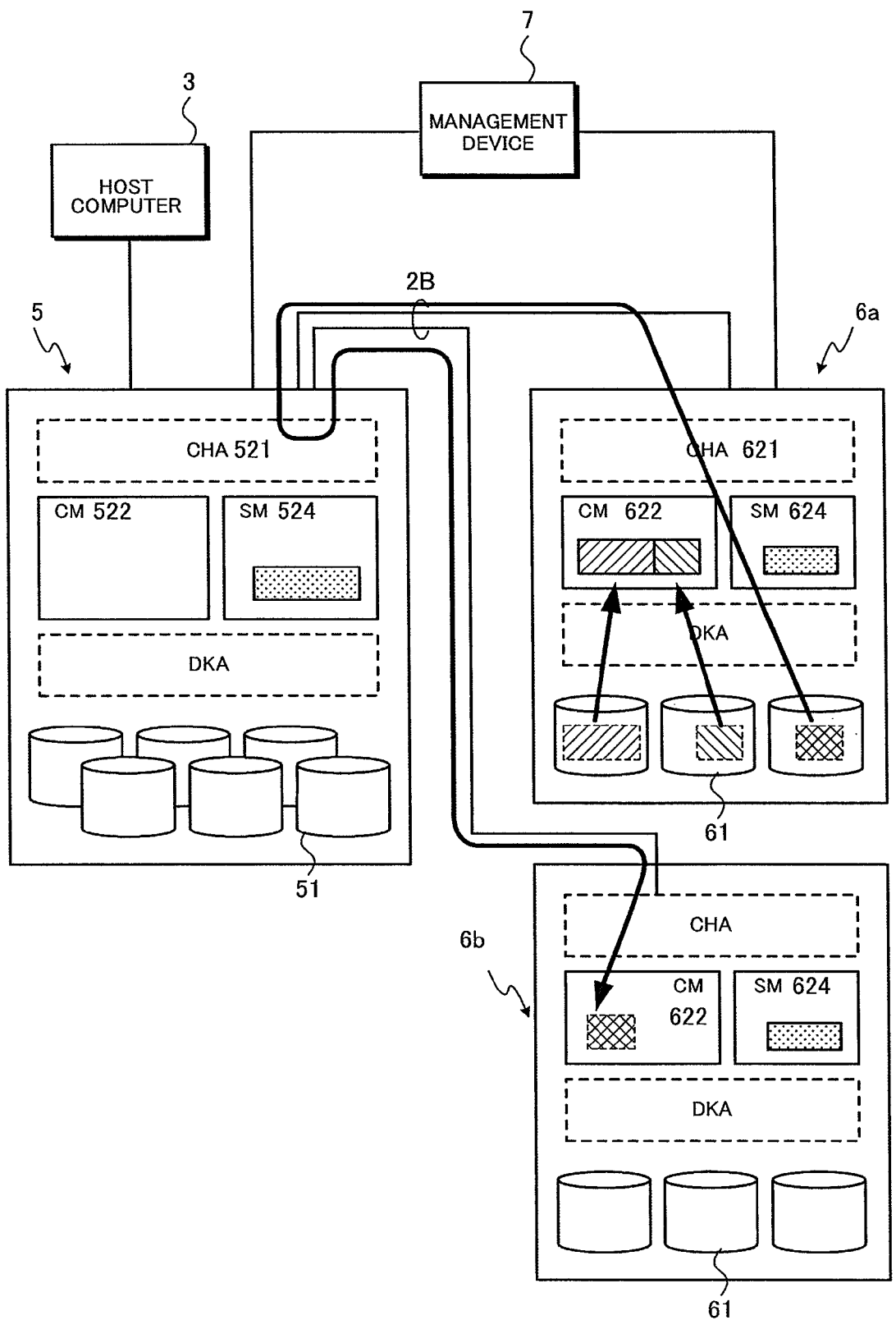
FIG. 30 is a conceptual diagram illustrating the cache residency function in the storage system according to an embodiment of the invention.

FIG. 30 is a conceptual diagram illustrating the cache residency function in the storage system 4 according to an embodiment of the invention. Although it shows a simplified form of the storage system 4 in FIG. 1, the structure is the same.

In the storage system 4 adopting the external storage connection configuration, the first storage apparatus 5 issues a residency setting instruction to a second storage apparatus 6a. If the first storage apparatus 5 realizes that the second storage apparatus 6a, which has received the residency setting instruction, cannot ensure a resident area in its cache memory 622, the first storage apparatus 5 selects a second storage apparatus 6b as an alternative external storage apparatus; and checks whether or not the second storage apparatus 6b can ensure a resident area. When the first storage apparatus 5 recognizes that the second storage apparatus 6b can ensure a resident area, the first storage apparatus 5 reads data from the second storage apparatus 6a and writes it in the resident area in the cache memory 622 in the second storage apparatus 6b. The first storage apparatus 5 then stores the relevant residency information in its shared memory 524.

Figure 31:
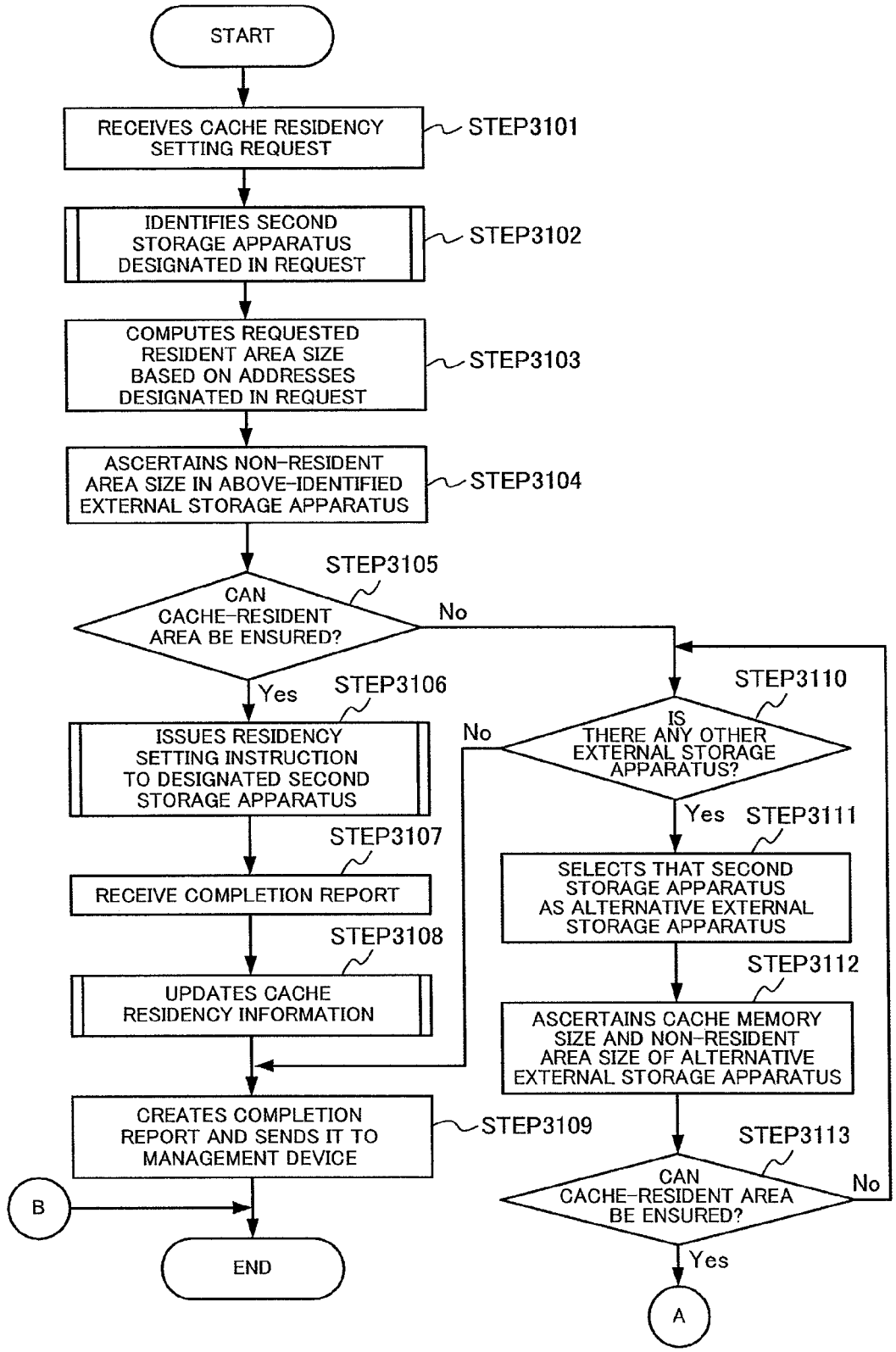
FIG. 31 is a flowchart for explaining the cache residency setting processing performed in the storage system according to an embodiment of the invention.
Figure 32:
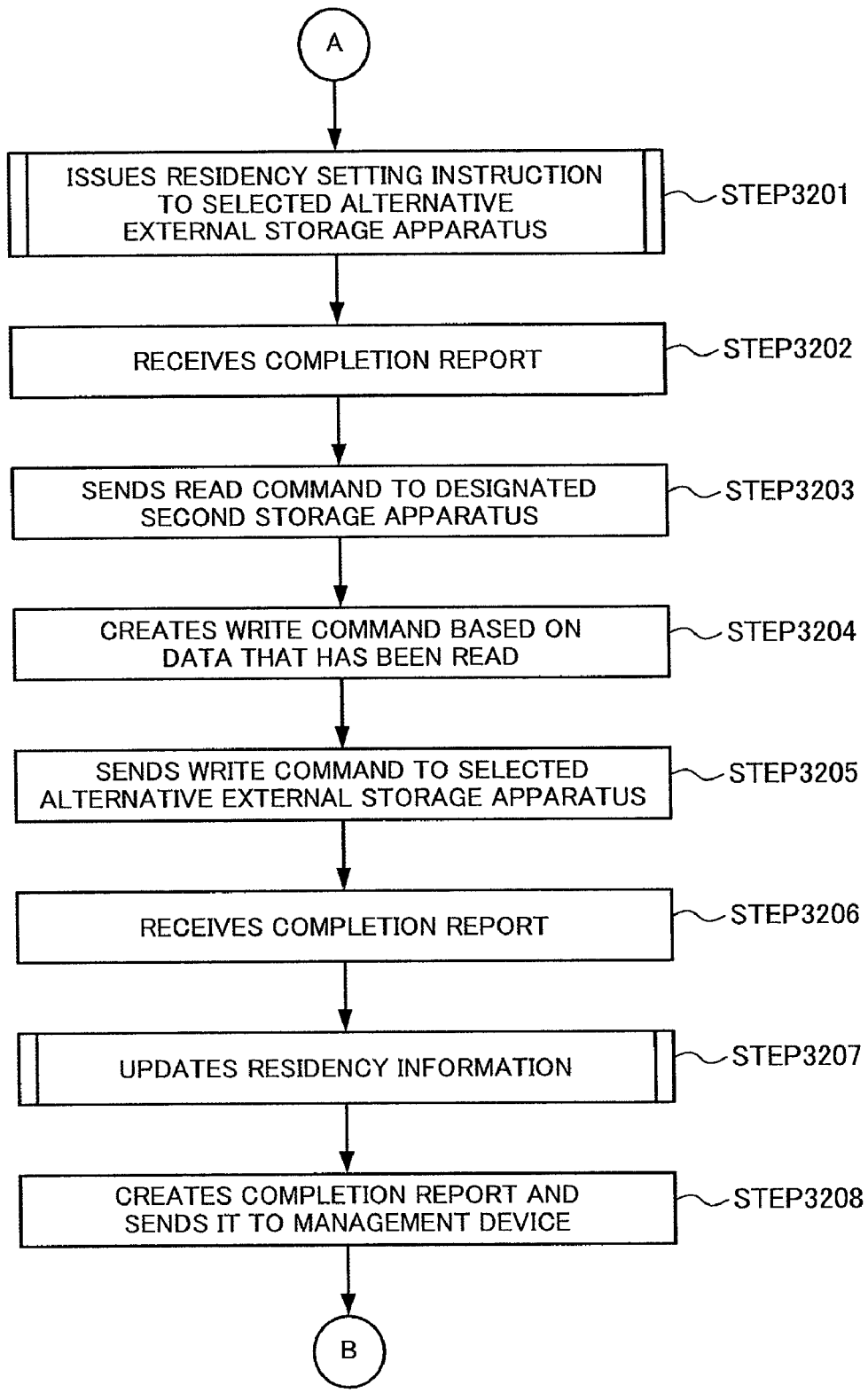
FIG. 32 is a flowchart for explaining the cache residency setting processing performed in the storage system according to an embodiment of the invention.

FIGS. 31 and 32 are flowcharts for explaining the cache residency setting processing performed in the storage system 4 according to an embodiment of the invention.

When the first storage apparatus 5 receives a cache residency setting request from the management device 7

(STEP3101), the first storage apparatus 5 identifies the second storage apparatus 6 designated in the request (STEP3102). More specifically, the first storage apparatus 5 identifies, with reference to its LDEV management table 400, the virtual device VDEV associated with the logical device LDEV designated in the request, and also identifies, with reference to its VDEV management table 500, the external storage apparatus and external logical device LDEV associated with the above-identified virtual device VDEV. Subsequently, the first storage apparatus 5 identifies, with reference to its external storage apparatus management table 600, the path for the above-identified external storage apparatus. These steps correspond to STEPS1202-1204 in FIG. 12. In this example, it is assumed that the second storage apparatus 6a is designated in the request.

The first storage apparatus 5 then computes the requested resident area size based on the start address and end address designated in the cache residency setting request (STEP3103). The first storage apparatus 5 then refers to its cache capacity management table 700 to ascertain the non-resident area size in the above-identified external storage apparatus (STEP3104), and checks whether or not a cache-resident area having the requested size can be ensured (STEP3105).

If the first storage apparatus 5 determines that the cache-resident area can be ensured (STEP3105; Yes), the first storage apparatus 5 issues a residency setting instruction to the second storage apparatus 6a (STEP3106), and waits for a completion report from the second storage apparatus 6a (STEP3107). More specifically, the first storage apparatus 5 creates a cache residency control command shown in FIG. 17; and sends it to the second storage apparatus 6a via the identified path. When the first storage apparatus 5 receives a completion report from the second storage apparatus 6a, it updates the cache residency information (STEP3108). These steps correspond to STEPS1212 and 1213 in FIG. 12. Then, the first storage apparatus 5 sends a completion report to the management device 7 in response to the residency setting request and terminates the process (STEP3109).

If the first storage apparatus 5 determines that a cache-resident area cannot be ensured in the second storage apparatus 6a (STEP3105; No), the first storage apparatus 5 further determines whether or not another second storage apparatus 6 is connected (STEP3110). If the first storage apparatus 5 determines that no other second storage apparatus 6 is connected (STEP3110; No), the first storage apparatus 5 sends an abnormal termination report to the management device 7 (STEP3109).

If the first storage apparatus 5 determines that another second storage apparatus 6 is connected (STEP3110; Yes), the first storage apparatus 5 selects that second storage apparatus 6 as an alternative external storage apparatus (STEP3111). The first storage apparatus 5 may select the alternative external storage apparatus in numerical order of the port numbers. Alternatively, the first storage apparatus 5 may select the alternative external storage apparatus having the large remaining space in its cache memory 622. Alternatively, the first storage apparatus 5 may select a second storage apparatus 6 with low access frequency. The access frequency is, for example, statistical information the disk adapter 521 obtains by monitoring its ports during operation. In this example, it is assumed that the second storage apparatus 6b is selected.

The first storage apparatus 5 then ascertains the non-resident area size of the selected second storage apparatus 6b (STEP3112), and determines whether or not a cache-resident area can be ensured in the cache memory 622b in the second storage apparatus 6b (STEP3113).

If the first storage apparatus 5 determines a cache-resident area can be ensured in the second storage apparatus 6b, the first storage apparatus 5 issues a residency setting instruction to the second storage apparatus 6b (STEP3201 in FIG. 32), and waits for a completion report from the second storage apparatus 6b (STEP3202). More specifically, the first storage apparatus 5 creates a cache residency control command shown in FIG. 33; and sends it to the second storage apparatus 6b via the identified path. The cache residency control command according to this embodiment includes the external storage apparatus number of the alternative, second storage apparatus 6b.

Upon receiving a completion report from the second storage apparatus 6b, the first storage apparatus 5 sends a read command, which is for reading the data stored in the storage areas in the residency setting target logical device LDEV designated in the request, to the second storage apparatus 6a designated in the residency setting request (STEP3203). the first storage apparatus 5 then creates a write command based on the data that has been read as commanded by the read command (STEP3204), sends it to the selected second storage apparatus 6b (STEP3205), and waits for a completion report (STEP3206). Thus, as shown in FIG. 34, the second storage apparatus 6b writes the data in its resident area in accordance with the write command and sends a completion report to the first storage apparatus 5.

Upon receiving an completion report from the second storage apparatus 6b, the first storage apparatus 5 updates the cache residency information based on the completion report (STEP3207). the first storage apparatus 5 then sends a completion report to the management device 7 as a response to the residency setting request (STEP3208).

Figure 34:
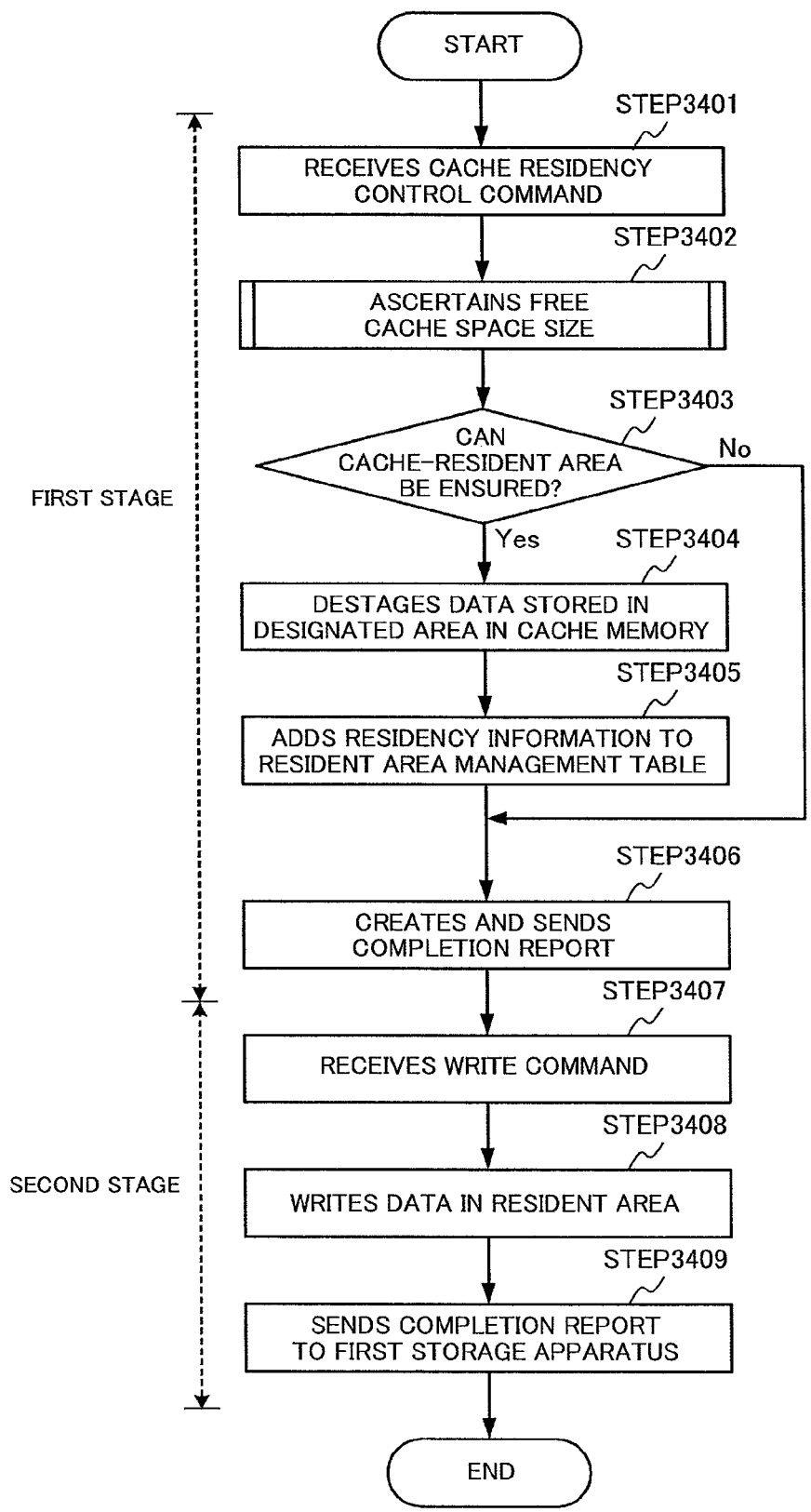
FIG. 34 is a flowchart for explaining the process performed in the second storage apparatus according to an embodiment of the invention.

FIG. 34 is a flowchart for explaining the processing performed in storage apparatus 6 according to this embodiment of the invention. More specifically, it explains the processing performed in the second storage apparatus 6b that is selected as the alternative external storage apparatus. The process is composed of a first stage for the residency setting process and a second stage for the write processing performed in accordance with a write command.

As shown in FIG. 34, having received a cache residency control command from the first storage apparatus 5 (STEP3401), the second storage apparatus 6b refers to its resident area management table 900 to ascertain its non-resident area size (STEP3402), and checks whether or not a cache-resident area can be ensured (STEP3403). If the second storage apparatus 6b judges a cache-resident area cannot be ensured (STEP3403; No), it sends a completion report including an error message to the first storage apparatus 5 (STEP3406).

If the second storage apparatus 6b judges a cache-resident area can be ensured (STEP3403; Yes), the second storage apparatus 6b destages the data stored in the designated area in its cache memory to its disk drive(s) 61 (STEP3404). More specifically, the channel adapter 621 in the second storage apparatus 6b destages, with reference to the directory information in its shared memory 624, the data stored in the storage area in the cache memory 622 to a predetermined storage area in the disk drive(s) 61. The second storage apparatus 6b then updates the residency information in its resident area management table 900 (STEP3405), and sends a completion report to the first storage apparatus 5 (STEP3406).

Upon receipt of a residency setting instruction from the first storage apparatus 5, the second storage apparatus 6b also receives a write command from the first storage apparatus 5 to write the data in a resident area (STEP3407). In response to this command, the second storage apparatus 6*b* refers to its resident area management table 900 and writes the data attached to the write command in a resident area (STEP3408). the second storage apparatus 6*b* then sends a completion report to the first storage apparatus 5 (STEP3409).

As described above, according to Embodiment 5, if a residency setting-requested second storage apparatus 6 does not have sufficient free spaces to use as resident areas in its cache memory 622, the first storage apparatus 5 detects another second storage apparatus 6 having enough free spaces to use as resident areas in its cache memory 622; and sets a resident area in that other second storage apparatus 6 in place of the designated second storage apparatus 6.

When the first storage apparatus 5 receives an I/O command from the host computer 3, the first storage apparatus 5 refers to the resident area management table 800 in its shared memory 524 and transfers that I/O command to the target logical device LDEV. More specifically, the first storage apparatus 5 determines whether or not the logical address the I/O command designates is for a resident area; and if it is so, sends that I/O command to the second storage apparatus 6 having the external storage apparatus number identified by referring to the resident area management table 800.

Figure 35:
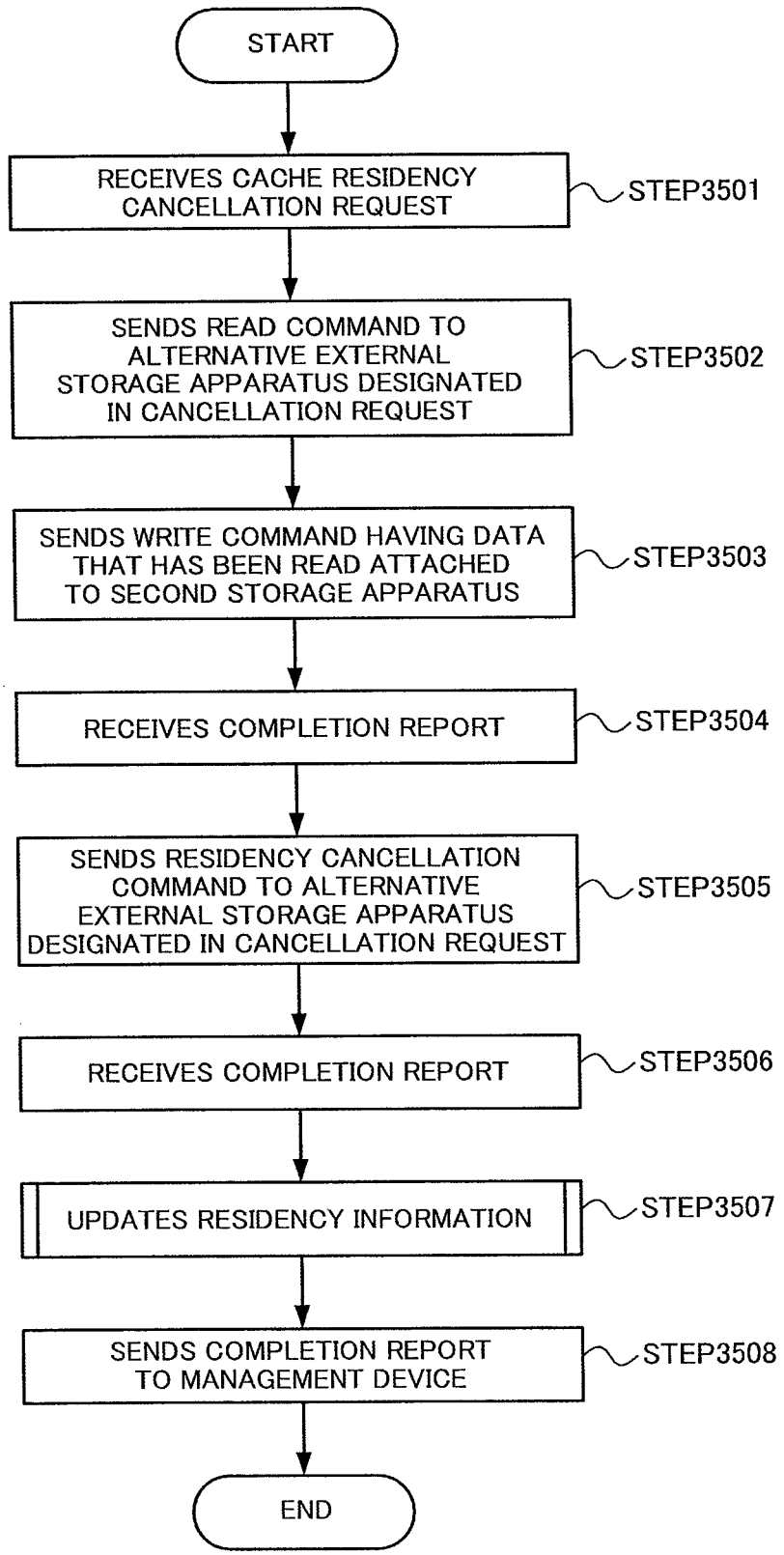
FIG. 35 is a flowchart for explaining the residency cancellation processing performed in the storage system according to an embodiment of the invention.

FIG. 35 is a flowchart for explaining the residency cancellation processing performed in the storage system 4 according to an embodiment of the invention.

The system administrator issues, via the Web console on the management device 7, a residency cancellation instruction to release the resident area for which the residency has been set. Having received the residency cancellation instruction via the Web console, the management device 7 sends a residency cancellation request to the first storage apparatus 5. An example where a resident area set in the second storage apparatus 6*b*, which is selected as an alternative external storage apparatus, is released is explained below.

Upon receipt of the residency cancellation request from the management device 7 (STEP3501), the first storage apparatus 5 sends a read command to the second storage apparatus 6*b* designated in the cancellation request (STEP3502). the first storage apparatus 5 then sends a write command having the data that has been read out of the second storage apparatus 6*b* as commanded by the above read command attached, to the original second storage apparatus 6*a* (STEP3503), and waits for a completion report from the second storage apparatus 6*a* (STEP3504). Upon receipt of the write command, the second storage apparatus 6*a* stores that data in accordance with the normal I/O process.

upon receipt of a completion report in response to the write command, the first storage apparatus 5 sends a residency cancellation command to the alternative second storage apparatus 6*b* (STEP3505); and waits for a completion report (STEP3506). Upon receipt of the residency cancellation command, the second storage apparatus 6*b* sends a completion report to the first storage apparatus 5 in accordance with the process shown in FIG. 13.

Upon receipt a completion report in response to the residency cancellation command, the first storage apparatus 5 updates the residency information (STEP3507), and sends a completion report to the management device 7 as a response to the residency cancellation request (STEP3508).

Embodiment 6

Embodiment 6 provides a storage system 4' adopting a grid structure with a cache residency function, in place of the external storage connection configuration.

Figure 36:
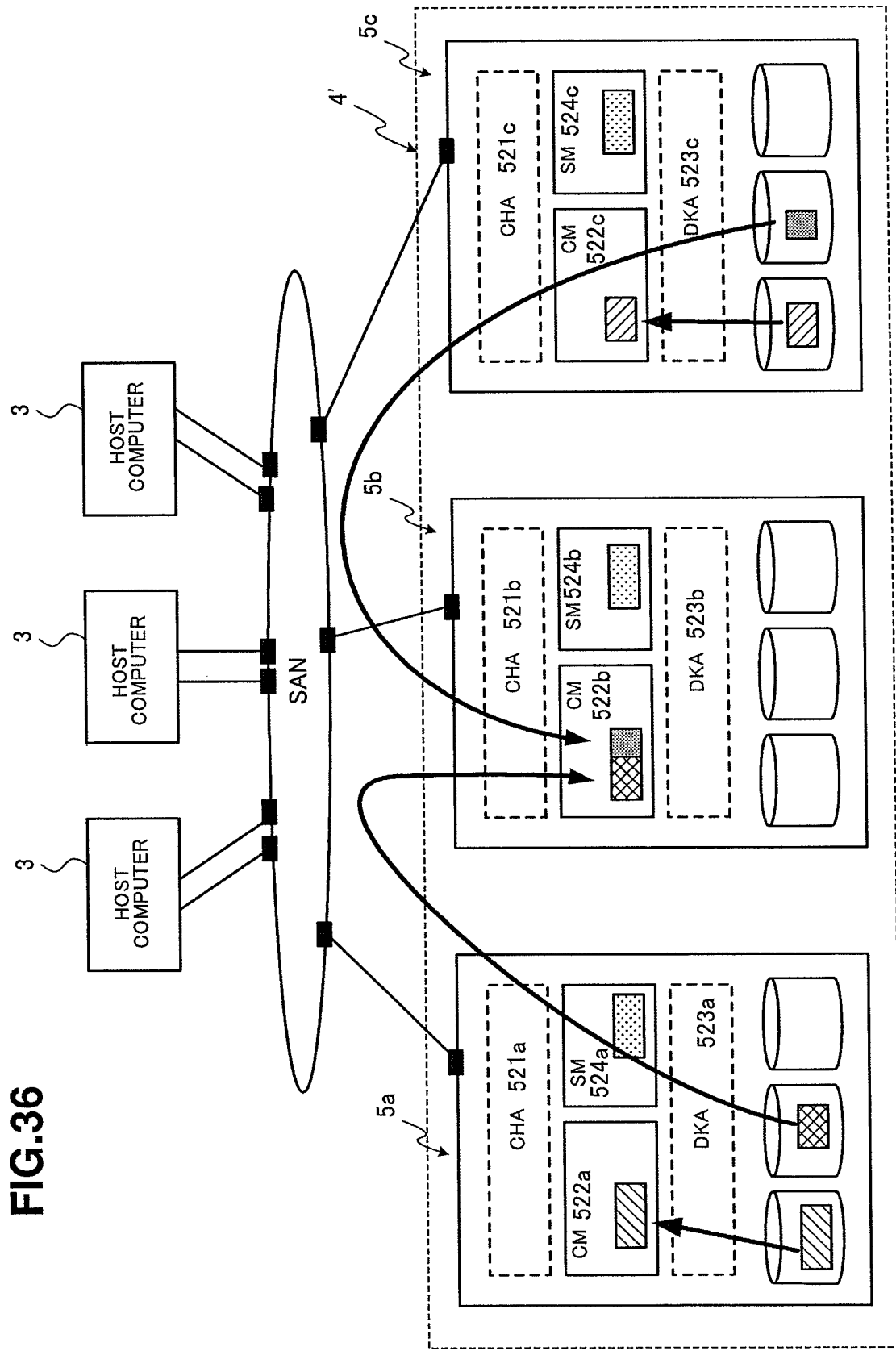
FIG. 36 is a conceptual diagram illustrating the cache residency setting processing performed in the storage system according to an embodiment of the invention.

FIG. 36 is a conceptual diagram illustrating the cache residency setting processing performed in the storage system 4' according to an embodiment of the invention.

As shown in FIG. 36, the storage apparatuses 5*a*-5*b* are all equal and are connected to the host computers 3 via a SAN, which serves as the channel 2A. In other words, the host computers 3 can directly access any of the storage apparatuses 5*a*-5*c*. The storage apparatuses 5*a*-5*b* are configured so that they can communicate with one another. For each storage apparatus 5, the other storage apparatuses 5 are seen as its external storage apparatuses.

The storage system 4' provides the cache memories 522*a*-522*c* in the respective storage apparatuses 5*a*-5*c* as if they are one cache memory.

Each storage apparatus 5*a*-5*c* stores, in its shared memory 524*a*-524*c*, the above-described LDEV management table 400, VDEV management table 500, external storage apparatus management table 600, cache capacity management table 700, and resident area management table 800. Any numbers may be used as the external storage apparatus numbers used in these tables as long as they can uniquely identify the respective storage apparatuses. The contents of these tables are the same in each storage apparatus 5*a*-5*c*.

The management device 7 (not shown in the drawing) issues a residency setting instruction to any one of the storage apparatuses 5*a*-5*c*. The storage apparatus 5 that receives the residency setting instruction performs the above-described residency setting processing; and sends the updated residency information to the other storage apparatuses 5 in order to maintain consistency in their residency information.

Figure 37:
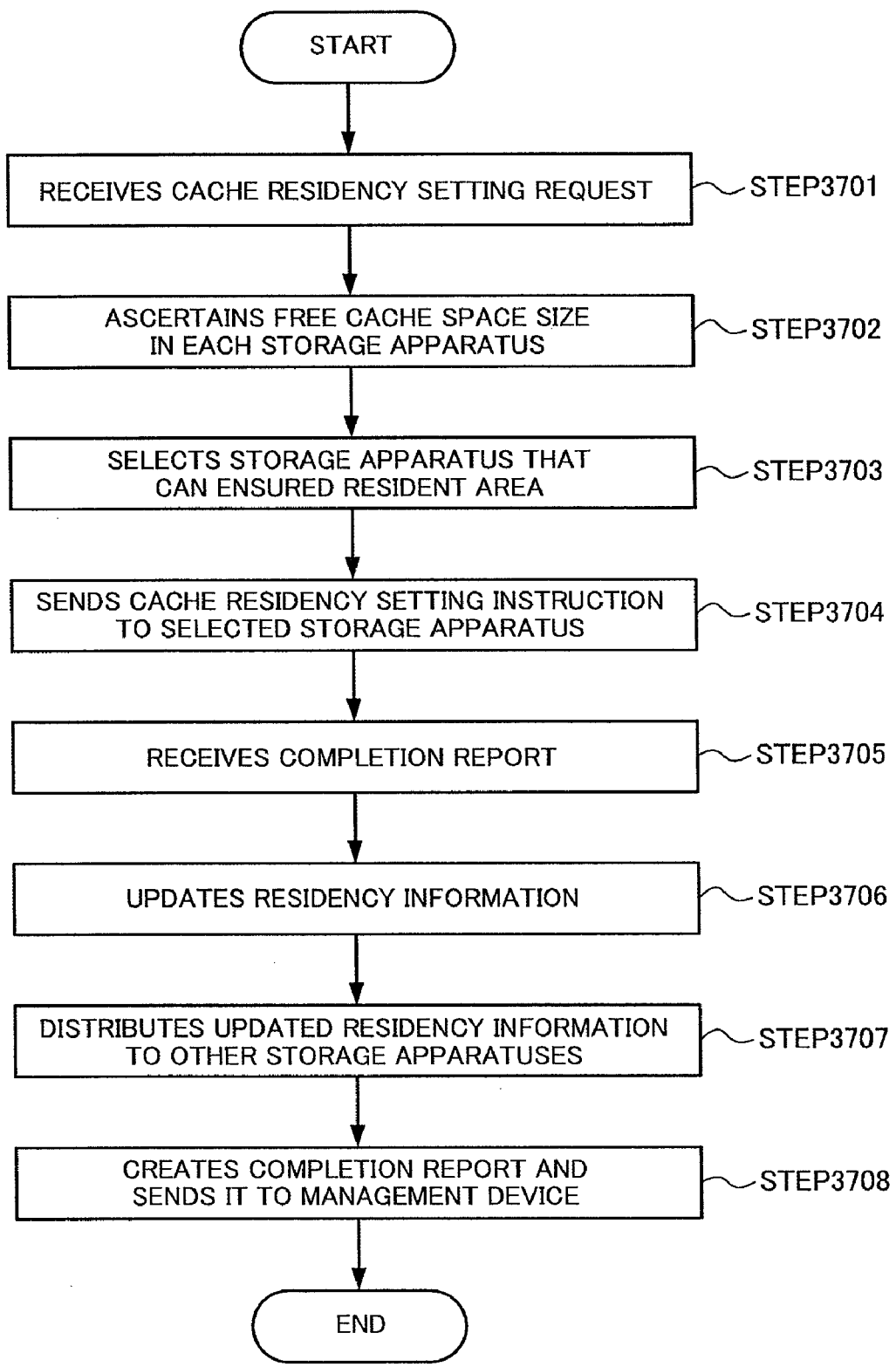
FIG. 37 is a flowchart for explaining cache residency setting processing performed in the storage system according to an embodiment of the invention.

FIG. 37 is a flowchart for explaining cache residency setting processing performed in the storage system 4' according to an embodiment of the invention.

As shown in FIG. 37, one of the storage apparatuses 5 in the storage system 4' receives a cache residency setting request from the management device 7 (STEP3701). In this example, it has been assumed that the storage apparatus 5*a* has received the setting request. The storage apparatus 5*a* refers to its resident area management table 800 to ascertain the free cache space sizes in the respective storage apparatuses 5 including itself (STEP3702). Based on the ascertained free cache space sizes, the storage apparatus 5*a* then selects the storage apparatus 5 having the largest free space in its cache memory 522 (STEP3703). The storage apparatus 5*a* may take other parameters such as the access frequency or cache usage rate into consideration. In this example, it is assumed that the storage apparatus 5*b* is selected.

The storage apparatus 5*a* then sends a cache residency setting instruction command to the selected storage apparatus 5*b* (STEP3704); and waits for a completion report for the instruction command (STEP3705). Having received the instruction command, the storage apparatus 5*b* performs the above-described residency setting processing; and sends a completion report to the storage apparatus 5*a*.

Upon receipt of the completion report, the storage apparatus 5*a* updates the residency information (STEP3706), and sends the updated residency information to the other storage apparatuses 5 (i.e., storage apparatuses 5*b* and 5*c*) (STEP3707). Upon receipt of the updated residency information, the other storage apparatuses 5*b* and 5*c* update their own residency information.

The storage apparatus 5*a* then sends a completion report to the management device 7 as a response to the residency setting request (STEP3708).

In this example, it has been assumed that the access frequency of the storage apparatus 5*b* from the host computers 3 is low and so the usage rate of the cache memory 522*b* is low and that the usage rates of the cache memories 522a and 522c in the storage apparatuses 5a and 5c are high. In that case, residency settings are made so that the data in the storage apparatuses 5a and/or 5c resides in the resident area in the cache memory 522b in the storage apparatus 5b. As a result, the cache memories 522a-522c in the storage apparatuses 5a-5c in the storage system 4' adopting the grid structure can be used effectively. Accordingly, the system performance of the storage system 4' can be improved.

The invention can be applied widely to storage systems having a plurality of storage apparatuses.

What is claimed is:

1. A storage system comprising:
    a first storage apparatus operatively connected to a host computer and providing a first logical device I/O-accessed by the host computer; and
    at least one second storage apparatus operatively connected to the first storage apparatus and providing a second logical device configured as at least a part of the first logical device,
    wherein the first storage apparatus comprises:
    a first disk drive; and
    a first controller configured to control the first disk drive based on a first I/O access request sent from the host computer,
    wherein the first controller comprises a first cache memory, intervening between the host computer and the first disk drive, configured to cache,
    wherein the at least one second storage apparatus comprises:
    a second disk drive; and
    a second controller operatively connected to the first storage apparatus and configured to control the second disk drive based on a second I/O access request received from the host computer via the first storage apparatus,
    wherein the second controller comprises a second cache memory, intervening between the host computer to the second disk drive, configured to cache the data related to the second I/O access request, and
    wherein the first controller sends, to the second storage apparatus, a residency setting instruction to set a predetermined area in the second cache memory that serves as a resident area, and
    wherein when the second storage apparatus sets a resident area, the first storage apparatus that has sent the residency setting instruction sends, to the other storage apparatuses, a resident area table for managing the resident areas in the other storage apparatuses.

2. The storage system according to claim 1, wherein the second controller sets the predetermined area in the second cache memory as the resident area.

3. The storage system according to claim 2, wherein the second controller stores save target data written in the predetermined area that is designated in the residency setting instruction in the second disk drive.

4. The storage system according to claim 2, wherein the first controller sends, to the second storage apparatus, a residency cancellation instruction to release the resident area set in the second cache memory.

5. The storage system according to claim 2, wherein the second controller writes residency setting target data stored in the second disk drive that is designated in the residency setting instruction in the resident area.

6. The storage system according to claim 5, wherein the second I/O access request includes the residency setting instruction.

7. The storage system according to claim 5, wherein the first controller has a resident area table for managing the resident area set in the second cache memory.

8. The storage system according to claim 7, wherein the resident area table includes data attributes for one or more resident areas in the second cache memory, and the first controller writes residency setting target data in a resident area in either the first cache memory or second cache memory based on the data attributes.

9. The storage system according to claim 7, wherein the resident area table includes information for the cache capacity of, and the resident area size, in the second cache memory.

10. The storage system according to claim 9, wherein the first controller determines whether or not the predetermined area in the second cache memory can be set as the resident area based on a non-resident area size, which is ascertained based on the cache capacity and the resident area size.

11. The storage system according to claim 10, wherein when the second storage apparatus sets the resident area in the second cache memory in accordance with the residency setting instruction, the first controller updates the resident area table based on the information for the resident area being set.

12. The storage system according to claim 10, wherein when the first controller determines that the predetermined area in the second cache memory cannot be set as the resident area, the first controller selects, based on the resident area table, from among two or more second storage apparatuses, another second storage apparatus having a second cache memory for which the resident area can be set; and performs control so that the resident area is set in the selected second storage apparatus.

13. The storage system according to claim 12, wherein the first controller performs control to read residency setting target data from the second disk drive in the second storage apparatus having the second cache memory that has been determined that the resident area cannot be set; and to write the residency setting target data in the selected second storage apparatus.

14. A method for controlling a cache-resident area used for a storage system comprising:
    a first storage apparatus operatively connected to a host computer and providing a first logical device I/O-accessed by the host computer; and
    at least one second storage apparatus operatively connected to the first storage apparatus and providing a second logical device configured as at least a part of the first logical device,
    wherein the first storage apparatus performs:
    identifying the second storage apparatus for which resident area setting is requested, based on an external residency setting request;
    determining whether or not a predetermined area in a cache memory provided in the designated second storage apparatus can be set as a resident area; and
    when determined that the predetermined area can be set as the resident area, controlling the second storage apparatus to set the resident area by sending a residency setting instruction, and
    wherein when the second storage apparatus sets a resident area, the first storage apparatus that has sent the residency setting instruction sends, to the other storage apparatuses, a resident area table for managing the resident areas in the other storage apparatuses.

15. A storage system comprising:
    a plurality of storage apparatuses connected to one another via a channel for connection with a host computer,
    wherein each of the storage apparatuses comprises;

a disk drive; and a controller configured to control the disk drive based on an I/O access request from the host computer, wherein the controller has a cache memory configured to cache, intervening between the host computer and the disk drive, the data related to the I/O access request, and one of the storage apparatuses sends, to a specified storage apparatus, a residency setting instruction to set a predetermined area in the cache memory in the specified storage area as a resident area; and having received the residency setting instruction, the specified storage apparatus sets the resident area based on the residency setting instruction, and wherein when the specified storage apparatus sets a resident area, the storage apparatus that has sent the residency setting instruction sends, to the other storage apparatuses, a resident area table for managing the resident areas in the other storage apparatuses.

* * * * *